US012264429B2

(12) United States Patent
White et al.

(10) Patent No.: US 12,264,429 B2
(45) Date of Patent: Apr. 1, 2025

(54) METHOD FOR OPERATING A LAUNDRY WASHING MACHINE USING A UNIT DOSE PACKAGE AND LAUNDRY WASHING MACHINE

(71) Applicant: Electrolux Home Products, Inc., Charlotte, NC (US)

(72) Inventors: Allison White, Charlotte, NC (US); Yihong Li, Charlotte, NC (US); Oscar Madalena, Charlotte, NC (US)

(73) Assignee: Electrolux Consumer Products, Inc., Charlotte, NC (US)

(*) Notice: Subject to any disclaimer, the term of this patent is extended or adjusted under 35 U.S.C. 154(b) by 0 days.

(21) Appl. No.: 18/630,260

(22) Filed: Apr. 9, 2024

(65) Prior Publication Data

US 2024/0254678 A1 Aug. 1, 2024

Related U.S. Application Data

(63) Continuation of application No. 17/322,046, filed on May 17, 2021, now Pat. No. 11,952,705, which is a (Continued)

(51) Int. Cl.
*C11D 17/04* (2006.01)
*D06F 21/04* (2006.01)
(Continued)

(52) U.S. Cl.
CPC .......... *D06F 39/028* (2013.01); *C11D 17/042* (2013.01); *D06F 21/04* (2013.01); *D06F 33/37* (2020.02); *D06F 33/43* (2020.02); *D06F 34/22* (2020.02); *D06F 35/008* (2013.01); *D06F 39/026* (2013.01); *D06F 39/087* (2013.01); *D06F 39/088* (2013.01); *C11D 2111/12* (2024.01); *D06F 2101/20* (2020.02);
(Continued)

(58) Field of Classification Search
None
See application file for complete search history.

(56) References Cited

U.S. PATENT DOCUMENTS 2,649,513 A 8/1953 Barley
2,821,848 A 2/1958 Becker
(Continued)

FOREIGN PATENT DOCUMENTS

BR 202014023113 Y1 4/2018
CN 1316109 C 5/2007
(Continued)

OTHER PUBLICATIONS

Brazil Patent Office, Brazilian Application No. 112019003786-1, Written Opinion, dated Jun. 23, 2021, 4 pages.
(Continued)

*Primary Examiner* — Levon J Shahinian
(74) *Attorney, Agent, or Firm* — Bradley Arant Boult Cummings LLP

(57) ABSTRACT

A laundry washing machine and a method for operating the washing machine offer ways to load a unit dose package into a compartment of the washing machine. A control unit controls the washing machine to add water to a compartment having a unit dose package. The tub is then filled with hot or cold water depending on the temperature of the water in the tub, or whether a sanitizing cycle of a washing program has been selected.

14 Claims, 17 Drawing Sheets

Related U.S. Application Data continuation of application No. 16/131,935, filed on Sep. 14, 2018, now Pat. No. 11,162,209.

(51) Int. Cl.

| | |
|---|---|
| ***D06F 33/37*** | (2020.01) |
| ***D06F 33/43*** | (2020.01) |
| ***D06F 34/22*** | (2020.01) |
| ***D06F 35/00*** | (2006.01) |
| ***D06F 39/02*** | (2006.01) |
| ***D06F 39/08*** | (2006.01) |
| *D06F 101/20* | (2020.01) |
| *D06F 103/16* | (2020.01) |
| *D06F 105/04* | (2020.01) |
| *D06F 105/52* | (2020.01) |

(52) U.S. Cl.

CPC ...... *D06F 2103/16* (2020.02); *D06F 2105/04* (2020.02); *D06F 2105/52* (2020.02)

(56) References Cited

U.S. PATENT DOCUMENTS

| | | | |
|---|---|---|---|
| 2,933,912 | A | 4/1960 | Billings |
| 2,976,711 | A | 3/1961 | Smith |
| 3,385,085 | A | 5/1968 | Engel |
| 3,589,150 | A | 6/1971 | Poletiek |
| 3,736,773 | A | 6/1973 | Waugh |
| 3,783,355 | A | 1/1974 | Kalman |
| 4,478,059 | A | 10/1984 | Yates |
| 4,759,202 | A | 7/1988 | Caron |
| 4,882,917 | A | 11/1989 | Mizusawa et al. |
| 5,500,967 | A | 3/1996 | Wilson |
| 5,548,978 | A | 8/1996 | Bongini et al. |
| 5,884,506 | A | 3/1999 | Blauert et al. |
| 7,036,177 | B2 | 5/2006 | Aouad et al. |
| 7,181,934 | B2 | 2/2007 | Hsu et al. |
| 8,931,311 | B2 | 1/2015 | Leibman et al. |
| 9,271,627 | B2 | 3/2016 | Alexander et al. |
| 9,574,297 | B2 | 2/2017 | Berndsen et al. |
| 9,637,857 | B2 | 5/2017 | Del Pos et al. |
| 9,663,893 | B2 | 5/2017 | Malheiros |
| 9,850,618 | B2 | 12/2017 | Burger et al. |
| 9,903,063 | B2 | 2/2018 | Carpenter et al. |
| 9,970,148 | B2 | 5/2018 | Alexander et al. |
| 9,976,246 | B2 | 5/2018 | Malheiros |
| 10,480,113 | B2 | 11/2019 | Favaro et al. |
| 10,519,590 | B2 | 12/2019 | Malheiros |
| 10,731,284 | B2 | 8/2020 | Alexander et al. |
| 10,815,607 | B2 | 10/2020 | Costa et al. |
| 2004/0088796 | A1 | 5/2004 | Neergaard et al. |
| 2004/0200245 | A1 | 10/2004 | Cheo et al. |
| 2005/0102767 | A1 | 5/2005 | Aouad et al. |
| 2005/0166645 | A1 | 8/2005 | Favret et al. |
| 2005/0229652 | A1 | 10/2005 | Kim et al. |
| 2005/0241072 | A1 | 11/2005 | Kim et al. |
| 2005/0274156 | A1 | 12/2005 | Yang |
| 2007/0130700 | A1 | 6/2007 | Cho et al. |
| 2007/0163307 | A1 | 7/2007 | Kramme et al. |
| 2007/0240456 | A1 | 10/2007 | Byun et al. |
| 2008/0295546 | A1 | 12/2008 | Cho et al. |
| 2009/0119849 | A1 | 5/2009 | Hill et al. |
| 2009/0293203 | A1 | 12/2009 | Hettinger |
| 2010/0325815 | A1 | 12/2010 | Im |
| 2011/0247147 | A1 | 10/2011 | Amos et al. |
| 2011/0277515 | A1 | 11/2011 | Doh |
| 2012/0060301 | A1 | 3/2012 | Kim |
| 2012/0060568 | A1 | 3/2012 | Buso et al. |
| 2012/0067089 | A1 | 3/2012 | Buso et al. |
| 2012/0272691 | A1 | 11/2012 | Leibman et al. |
| 2014/0060121 | A1 | 3/2014 | Burger et al. |
| 2014/0060581 | A1 | 3/2014 | Alexander et al. |
| 2014/0060594 | A1 | 3/2014 | Alexander et al. |
| 2014/0157835 | A1 | 6/2014 | Del Pos et al. |
| 2014/0165663 | A1 | 6/2014 | Celotto et al. |
| 2015/0013075 | A1 | 1/2015 | Herrera et al. |
| 2015/0059413 | A1 | 3/2015 | Yoo et al. |
| 2015/0267340 | A1 | 9/2015 | Malheiros |
| 2015/0345069 | A1 | 12/2015 | Leibman et al. |
| 2016/0047077 | A1 | 2/2016 | Leibman et al. |
| 2016/0237612 | A1 | 8/2016 | Ghosh |
| 2017/0073877 | A1 | 3/2017 | Hettinger et al. |
| 2017/0297770 | A1 | 10/2017 | Snider et al. |
| 2018/0073185 | A1 | 3/2018 | Burger et al. |
| 2018/0135226 | A1 | 5/2018 | Alexander et al. |
| 2018/0155864 | A1 | 6/2018 | Alexander et al. |
| 2019/0017208 | A1 | 1/2019 | Marangoni et al. |
| 2019/0136440 | A1 | 5/2019 | Clarke et al. |
| 2020/0087838 | A1 | 3/2020 | White |
| 2020/0370229 | A1 | 11/2020 | Bensel et al. |
| 2021/0025103 | A1 | 1/2021 | Li et al. |

FOREIGN PATENT DOCUMENTS

| | | | |
|---|---|---|---|
| DE | 7834912 | U1 | 3/1979 |
| DE | 19535203 | C1 | 10/1996 |
| DE | 19537671 | A1 | 4/1997 |
| EP | 0959171 | A1 | 11/1999 |
| EP | 1126070 | A1 | 8/2001 |
| EP | 2025798 | A1 | 2/2009 |
| EP | 2239363 | A1 | 10/2010 |
| EP | 2241669 | A1 | 10/2010 |
| EP | 2497855 | A1 | 9/2012 |
| EP | 2540902 | A1 | 1/2013 |
| EP | 3037582 | A1 | 6/2016 |
| EP | 3184688 | A1 | 6/2017 |
| EP | 3257998 | A1 | 12/2017 |
| EP | 3293302 | A1 | 3/2018 |
| EP | 3660198 | A1 | 6/2020 |
| FR | 1209601 | A | 3/1960 |
| GB | 586424 | A | 3/1947 |
| GB | 589374 | A | 6/1947 |
| JP | 2016073330 | A | 5/2016 |
| KR | 101215448 | B1 | 12/2012 |
| WO | WO 2005059229 | A1 | 6/2005 |
| WO | WO 2005061685 | A1 | 7/2005 |
| WO | WO 2007051988 | A1 | 5/2007 |
| WO | WO 2015197109 | A1 | 12/2015 |
| WO | WO 2016101994 | A1 | 6/2016 |
| WO | WO 2016102005 | A1 | 6/2016 |

OTHER PUBLICATIONS

Patent Cooperation Treaty, International Application No. PCT/EP2014/079129, International Search Report and Written Opinion, dated Mar. 23, 2015, 11 pages.

Patent Cooperation Treaty, International Application No. PCT/EP2014/079176, International Preliminary Report on Patentability, dated Jun. 27, 2017, 7 pages.

Patent Cooperation Treaty, International Application No. PCT/EP2014/079176, International Search Report and Written Opinion, dated Mar. 9, 2015, 9 pages.

Patent Cooperation Treaty, International Application No. PCT/EP2017/072466, International Search Report and Written Opinion, dated Nov. 10, 2017, 11 pages.

Patent Cooperation Treaty, International Application No. PCT/EP2019/072846, International Search Report and Written Opinion, dated Oct. 22, 2019, 11 pages.

Patent Cooperation Treaty, International Application No. PCT/EP2020/068875, International Search Report and Written Opinion, dated Sep. 22, 2020, 11 pages.

Patent Cooperation Treaty, International Application No. PCT/EP2020/071064, International Search Report and Written Opinion, dated Nov. 9, 2020, 14 pages.

Patent Cooperation Treaty, International Application No. PCT/IB2019/000746, International Search Report and Written Opinion, dated Jun. 25, 2020, 18 pages.

U.S. Patent Trademark Office, U.S. Appl. No. 15/537,701, Notice of Allowance, dated May 19, 2020, 9 pages.

(56) References Cited

OTHER PUBLICATIONS

U.S. Patent Trademark Office, U.S. Appl. No. 16/131,757, Non-Final Office Action, dated Apr. 1, 2020, 17 pages.
U.S. Patent Trademark Office, U.S. Appl. No. 16/131,757, Final Office Action, dated Aug. 6, 2020, 15 pages.
U.S. Patent Trademark Office, U.S. Appl. No. 16/131,757, Non-Final Office Action, dated Oct. 16, 2020, 20 pages.
U.S. Patent Trademark Office, U.S. Appl. No. 16/131,757, Notice of Allowance, dated Mar. 17, 2021, 30 pages.
U.S. Patent Trademark Office, U.S. Appl. No. 16/131,912, Non-Final Office Action, dated Aug. 19, 2020, 19 pages.
U.S. Patent Trademark Office, U.S. Appl. No. 16/131,912, Notice of Allowance, dated Dec. 9, 2020, 17 pages.
U.S. Patent Trademark Office, U.S. Appl. No. 16/131,912, Notice of Allowance, dated Feb. 22, 2021, 14 pages.
U.S. Patent Trademark Office, U.S. Appl. No. 16/131,921, Non-Final Office Action, dated Apr. 30, 2021, 16 pages.
U.S. Patent Trademark Office, U.S. Appl. No. 16/131,921, Final Office Action, dated Mar. 19, 2020, 28 pages.
U.S. Patent Trademark Office, U.S. Appl. No. 16/131,921, Non-Final Office Action, dated Dec. 22, 2020, 32 pages.
U.S. Patent Trademark Office, U.S. Appl. No. 16/131,935, Non-Final Office Action, dated Jan. 25, 2021, 14 pages.
U.S. Patent Trademark Office, U.S. Appl. No. 16/131,935, Final Office Action, dated Mar. 18, 2021, 21 pages.
U.S. Patent Trademark Office, U.S. Appl. No. 16/131,935, Notice of Allowance, dated Jun. 24, 2021, 12 pages.
U.S. Patent Trademark Office, U.S. Appl. No. 16/332,116, Notice of Allowance, dated Jan. 25, 2021, 8 pages.
U.S. Patent Trademark Office, U.S. Appl. No. 16/332,116, Notice of Allowance, dated Mar. 19, 2021, 23 pages.
U.S. Patent Trademark Office, U.S. Appl. No. 16/522,156, Non-Final Office Action, dated Feb. 10, 2021, 46 pages.
U.S. Patent Trademark Office, U.S. Appl. No. 16/522,156, Notice of Allowance, dated Jun. 29, 2021, 10 pages.
U.S. Patent Trademark Office, U.S. Appl. No. 16/822,637, Final Office Action, dated May 9, 2022, 27 pages.
U.S. Patent Trademark Office, U.S. Appl. No. 16/822,637, Notice of Allowance, dated Aug. 22, 2022, 7 pages.
U.S. Patent Trademark Office, U.S. Appl. No. 16/822,728, Final Office Action, dated Jul. 12, 2022, 24 pages.
U.S. Patent Trademark Office, U.S. Appl. No. 16/822,728, Final Office Action, dated Apr. 7, 2023, 15 pages.
U.S. Patent Trademark Office, U.S. Appl. No. 16/822,728, Non-Final Office Action, dated Oct. 24, 2022, 12 pages.
U.S. Patent Trademark Office, U.S. Appl. No. 17/054,667, Non-Final Office Action, dated May 1, 2023, 11 pages.
U.S. Patent Trademark Office, U.S. Appl. No. 17/128,947, Non-Final Office Action, dated Mar. 2, 2022, 9 pages.
U.S. Patent Trademark Office, U.S. Appl. No. 17/128,947, Non-Final Office Action, dated Mar. 22, 2023, 13 pages,.
U.S. Patent Trademark Office, U.S. Appl. No. 17/171,193, Notice of Allowance, dated Oct. 25, 2022, 10 pages.
U.S. Patent Trademark Office, U.S. Appl. No. 17/322,046, Non-Final Office Action, dated Aug. 31, 2023, 7 pages.
U.S. Patent Trademark Office, U.S. Appl. No. 17/541,941, Non-Final Office Action, dated Mar. 14, 2022, 11 pages.
U.S. Patent Trademark Office, U.S. Appl. No. 17/541,941, Advisory Action, dated Sep. 26, 2022, 7 pages.
U.S. Patent Trademark Office, U.S. Appl. No. 17/752,364, Non-Final Office Action, dated Aug. 15, 2023, 10 pages.
U.S. Patent Trademark Office, U.S. Appl. No. 17/752,364, Final Office Action, dated Dec. 11, 2023, 17 pages.
U.S. Patent Trademark Office, U.S. Appl. No. 17/752,364, Notice of Allowance, dated Apr. 23, 2024, 10 pages.

METHOD FOR OPERATING A LAUNDRY WASHING MACHINE USING A UNIT DOSE PACKAGE AND LAUNDRY WASHING MACHINE

CROSS-REFERENCE TO RELATED APPLICATIONS

This application is a continuation of U.S. patent application Ser. No. 17/322,046, filed on May 17, 2021, now U.S. Pat. No. 11,952,705, which is a continuation of U.S. patent application Ser. No. 16/131,935, filed on Sep. 14, 2018, now U.S. Pat. No. 11,162,209, the entire disclosures of which are incorporated herein by reference.

TECHNICAL FIELD

The present invention relates to the field of laundry washing techniques. In particular, the present invention relates to a method for operating a laundry washing machine using a unit dose package, more particularly a unit dose detergent, and to a laundry washing machine configured to use the same.

BACKGROUND

Nowadays the use of laundry washing machines, both “simple” laundry washing machines (i.e. laundry washing machines which can only wash and rinse laundry) and laundry washing-drying machines (i.e. laundry washing machines which can also dry laundry), is widespread.

As described herein the term “laundry washing machine” will refer to both simple laundry washing machines and laundry washing-drying machines.

Laundry washing machines generally comprise an external casing, or cabinet, provided with a washing tub, which contains a rotatable perforated drum where the laundry is placed. A loading/unloading door ensures access to the drum.

Laundry washing machines typically comprise a water supply unit and a products supply unit, or dispenser, for the introduction of water and treating agents (i.e. detergent, softener, rinse conditioner, etc.) into the tub.

Applicant has performed a plurality of washing cycles using a unit dose package which are inserted into the drum together with the laundry at the beginning of the cycle. The unit dose package comprises a pre-measured amount of treating agent incorporated into a water-soluble pouch, wherein the treating agent includes detergent. Hereinafter, we will indicate the unit dose package simply with the term “pod”.

The use of pods, nevertheless, has some drawbacks.

A drawback posed by the use of pods lies in that the pod may easily remain trapped in the middle of the load, between clothing, determining a residual undissolved detergent into the fabric at the end of cycle, thus creating undesired spots or stains on the laundry.

Another drawback posed by the use of pods is due to the presence of undissolved product of the pod, inside the laundry washing machine, at the end of the washing cycle. In particular, residual product may be found inside the bellows connecting the tub to the external casing. Due to the movement of the drum, the pod may move inside the bellows which is typically S-shaped. The pod may remain inside the bellows for the whole cycle. Part of the detergent dose is therefore not used during the laundry washing cycle and the cleaning effect is negatively affected.

A further drawback posed by the undissolved residual product, for example residual detergent trapped inside the bellows, is that it may successively come into contact with the laundry in a rinsing phase of the laundry washing cycle, for example due to the movement of the drum which causes the residual detergent leaving the bellows. The presence of a quantity of residual detergent during a rinsing phase may cause insufficient rinsing. Insufficient rinsing, in turn, can leave detergent in laundry to affect people with allergies or sensitivity.

A further drawback posed by use of pods is due to the possibility that the pod inserted in the drum breaks down, or its pouch dissolves, before the washing cycle begins. In such situation, the detergent may fall down on the bottom of the tub. In case the washing cycle starts with a draining phase, which is typically performed for safety and/or hygienic reasons at the very beginning of the cycle, the detergent from the bottom of the tub is drained to the outside. The washing cycle then could even be carried out without use of detergent.

Another drawback posed by use of pods is due to the possibility that the washing cycle begins after a delay time with respect to the time of insertion of the pod inside the drum, for example in laundry washing machines with time delay option. Time delay allows the user to load the washing machine with pod and start it later. The pod inserted in the drum may break down, or its pouch may dissolve, before the washing cycle begins. This may create undesired spots or stains on the laundry.

Furthermore, due to the pod breakage, the detergent may fall down on the bottom of the tub. As explained above, in the case of when the washing cycle starts with a draining phase, the detergent from the bottom of the tub is drained to the outside.

The washing cycle then could even be carried out without use of detergent. Another drawback posed by the use of pods is due to the indeterminateness of the effective time of breakage of the pod and therefore the effective time of release of the detergent contained therein. In fact, it is not possible to predict the exact time of breakage of the pod and hence the exact time when the detergent is being distribute over the laundry.

This indeterminateness negatively affects the performance/efficiency of the washing cycle selected by the user since every washing cycle is typically optimized on the base of the time period during which the detergent is in contact with the laundry and performs its cleaning effect.

SUMMARY

The concepts disclosed herein are intended to address alleviate the above noted problems with laundry washing machines using a unit dose product. It has been found that various embodiments may be useful to address the foregoing problems, or to provide other utility or advantages. Examples are discussed herein.

In one aspect of the invention, there is provided a laundry washing machine, having a cabinet supporting a washing tub, a washing drum rotatably mounted within the washing tub and configured to receive a laundry load, a treating agents dispenser comprising a compartment configured to receive a unit dose package containing a pre-measured amount of a treating agent, one or more water conveying lines configured to convey water to the compartment, a supply line fluidly connecting the treating agents dispenser and the washing tub, and a control unit configured to control the laundry washing machine. The control unit is configured to: activate a controllable valve to provide a first water supply to the washing tub through the one or more water conveying lines and the compartment, measure a temperature of water in the washing tub and store a value of the measured temperature in a memory of the control unit, and perform a selection process based at least in part on the value of the measured temperature. The selection process includes electing between one of: (a) filling the washing tub with a volume of hot water when the value of the measured temperature is equal to or below a predetermined value, and (b) filling the washing tub with a volume of cold water when the value of the measured temperature is above the predetermined value.

In some embodiments, the predetermined value may be 25° C.

In some embodiments, the selection process may be based at least in part on the value of the measured temperature and on a determination of whether or not the laundry washing mode is operating in a predetermined operating mode. In such case, step (b) of the selection process may include filling the washing tub with a volume of cold water when both (i) the value of the measured temperature is above the predetermined value and (ii) the laundry washing machine is not operating in the predetermined operating mode, and the selection process may further include (c) filling the washing tub with a volume of hot water when both (i) the value of the measured temperature is above the predetermined value and (ii) the laundry washing machine is operating in the predetermined operating mode. The predetermined operating mode may be a sanitizing cycle.

In some embodiments, the control unit may be further configured to control the laundry washing machine, after completing performance of the selection process, to fill the washing tub with an additional volume of water. The additional volume of water may be a volume of water sufficient to fill the washing tub to a water level corresponding to one or both of a preselected washing program and a sensed load level within the washing tub.

The control unit may be configured to provide the first water supply by: activating the controllable valve to provide a first portion of the first water supply; waiting a predetermined time without providing water through the controllable valve; and after the predetermined time elapses, activating the controllable valve to provide a second portion of the first water supply. In some embodiments, the predetermined time may be at least 10 seconds. In some embodiments, the predetermined time may be at least 20 seconds. In some embodiments, the predetermined time may be at least 30 seconds.

In some embodiments the one or more water conveying lines may include at least one nozzle for generating a water jet over the compartment, such that water from the at least one water jet is oriented to directly hit the unit dose package.

In some embodiments the laundry washing machine may include an interface unit arranged at a surface of the cabinet and configured to communicate user input selections to the control unit. The user interface unit has a selection input for selecting a washing program configured for using a unit dose package, wherein the control unit selects the washing program configured for using a unit dose package as the default washing program until a user input is received to change the washing program to a different washing program.

In some embodiments the unit dose package may be a laundry-treating composition in a water-soluble membrane.

In some embodiments the control unit may be configured to control a sensor in the laundry washing machine to monitor at least one of a water level, pressure or a moisture level in the washing tub. When the at least one water level, pressure or moisture level is below a predetermined threshold, water may be supplied to the washing tub to maintain a water level for the selected washing program.

In another aspect of the invention, there is provided a method for operating a laundry washing machine. The method includes: receiving a unit dose package including a pre-measured amount of treating agent into a compartment of a treating agents dispenser of the laundry washing machine, providing a first supply of water to a compartment configured for receiving a unit dose package, measuring a temperature of water in a washing tub of the laundry washing machine, and performing a selection process based at least in apart on the measured temperature. The selection process includes electing between one of: (a) filling the washing tub with a volume of hot water when the measured temperature is equal to or below a predetermined value, and (b) filling the washing tub with a volume of cold water when the measured temperature is above the predetermined value.

In some embodiments, the predetermined value may be 25° C.

In some embodiments, the selection process may be based at least in part on the value of the measured temperature and on a determination of whether or not the laundry washing mode is operating in a predetermined operating mode. In such case, step (b) of the selection process may include filling the washing tub with a volume of cold water when both (i) the value of the measured temperature is above the predetermined value and (ii) the laundry washing machine is not operating in the predetermined operating mode, and the selection process may further include (c) filling the washing tub with a volume of hot water when both (i) the value of the measured temperature is above the predetermined value and (ii) the laundry washing machine is operating in the predetermined operating mode.

In some embodiments, the control unit may be further configured to control the laundry washing machine, after completing performance of the selection process, to fill the washing tub with an additional volume of water. The additional volume of water may be a volume of water sufficient to fill the washing tub to a water level corresponding to one or both of a preselected washing program and a sensed load level within the washing tub.

In some embodiments, providing the first supply of water may include: providing a first portion of the first supply of water; waiting a predetermined time without providing additional water to the compartment; and, after the predetermined time elapses, providing a second portion of the first supply of water to the compartment, In some embodiments, the predetermined time may be at least 10 seconds. In some embodiments, the predetermined time may be at least 20 seconds. In some embodiments, the predetermined time may be at least 30 seconds.

In some embodiments, the unit dose package may be a laundry-treating composition in a water-soluble membrane.

The foregoing aspects may provide improved dissolution of the unit dose package and mixing of detergent into the wash water, and may provide better control over the temperature of the water in the washing tub.

In another aspect, there is provided a method for operating a laundry washing machine. The method includes: providing, at a user input, a unit dose package operation mode control; deactivating a default detergent operation mode and activating a unit dose package operation mode in response to receiving a first selection of the unit dose package operation mode control from the user input; performing a plurality of complete washing cycles in the unit dose package operation mode without receiving a further selection of the unit dose package operation mode from the user input; and deactivating the unit dose package operation mode and activating the default detergent operating mode in response to receiving a second selection of the unit dose package operation mode control from the user input. The default detergent operation mode comprises one or more operating parameters that are different from the operating parameters of the unit dose package operation mode.

In some embodiments, performing a plurality of complete washing cycles in the unit dose package operation mode without receiving a further selection of the unit dose package operation mode from the user input further may comprise cycling the power state of the laundry washing machine between at least two successive complete washing cycles.

In some embodiments, performing a plurality of complete washing cycles in the unit dose package operation mode without receiving a further selection of the unit dose package operation mode from the user input may further comprise receiving a selection at a user input to change a washing cycle and changing the washing cycle between at least two successive complete washing cycles, such that the two successive complete washing cycles comprise different washing cycles.

In some embodiments, performing a plurality of complete washing cycles in the unit dose package operation mode without receiving a further selection of the unit dose package operation mode from the user input may further comprise receiving a selection at a user input to change an operating parameter of a washing cycle and changing the operating parameter of the washing cycle between at least two successive complete washing cycles, such that the two successive complete washing cycles are performed with different operating parameters.

In some embodiments, the method also may include: receiving a selection at a user input to change a washing cycle to an exempt washing cycle; temporarily deactivating the unit dose package operation mode and activating the default detergent operation mode; performing the exempt washing cycle in the default detergent operation mode; and automatically activating the unit dose package operation mode and deactivating the default detergent mode upon one or more of: terminating the exempt washing cycle, or receiving a selection at the user input to change to a washing cycle that is not an exempt washing cycle. The exempt washing cycle may be a rinse cycle.

In some embodiments, the default detergent operation mode comprises a first procedure for dispensing water into the laundry washing machine, and the unit dose package operation mode comprises a second procedure for dispensing water into the laundry washing machine, the second procedure being different from the first procedure.

In another aspect, there is provided a method for operating a laundry washing machine. The method comprises: providing, at a user input, a unit dose package operation mode control;

deactivating a default detergent operation mode and activating a unit dose package operation mode in response to receiving a first selection of the unit dose package operation mode control from the user input, wherein the default detergent operation mode comprises one or more operating parameters that are different from the operating parameters of the unit dose package operation mode; performing a plurality of complete washing cycles in the unit dose package operation mode without receiving a further selection of the unit dose package operation mode from the user input; receiving a selection at a user input to change a washing cycle to an exempt washing cycle; temporarily deactivating the unit dose package operation mode and activating the default detergent operation mode; performing the exempt washing cycle in the default detergent operation mode; and automatically activating the unit dose package operation mode and deactivating the default detergent mode upon one or more terminating the exempt washing cycle deactivating the unit dose package operation mode and activating the default detergent operating mode in response to receiving a second selection of the unit dose package operation mode control from the user input. The exempt washing cycle may be a rinse cycle.

In some embodiments, performing a plurality of complete washing cycles in the unit dose package operation mode without receiving a further selection of the unit dose package operation mode from the user input further comprises cycling the power state of the laundry washing machine between at least two successive complete washing cycles.

In still other embodiments, performing a plurality of complete washing cycles in the unit dose package operation mode without receiving a further selection of the unit dose package operation mode from the user input may further comprise receiving a selection at a user input to change a washing cycle and changing the washing cycle between at least two successive complete washing cycles, such that the two successive complete washing cycles comprise different washing cycles.

In other embodiments, performing a plurality of complete washing cycles in the unit dose package operation mode without receiving a further selection of the unit dose package operation mode from the user input may further comprise receiving a selection at a user input to change an operating parameter of a washing cycle and changing the operating parameter of the washing cycle between at least two successive complete washing cycles, such that the two successive complete washing cycles are performed with different operating parameters.

The default detergent operation mode may comprise a first procedure for dispensing water into the laundry washing machine, and the unit dose package operation mode may comprise a second procedure for dispensing water into the laundry washing machine, the second procedure being different from the first procedure.

These aspects may provide improved user experience and predictability in operating a laundry washing machine in a unit dose package mode.

Additional advantages and novel features of the examples will be set forth in part in the description that follows, and in part will become apparent to those skilled in the art upon examination of the following and the accompanying drawings or may be learned by production or operation of the examples. The advantages of the present subject matter may be realized and attained by means of methodologies, instrumentalities and combinations particularly pointed out in the appended claims.

BRIEF DESCRIPTION OF THE DRAWINGS

The drawing figures depict one or more implementations in accordance with the present concepts, by way of example only, not by way of limitation. In the drawings, corresponding characteristics and/or components are identified by the same reference numbers.

DETAILED DESCRIPTION OF THE INVENTION

Figure 1:
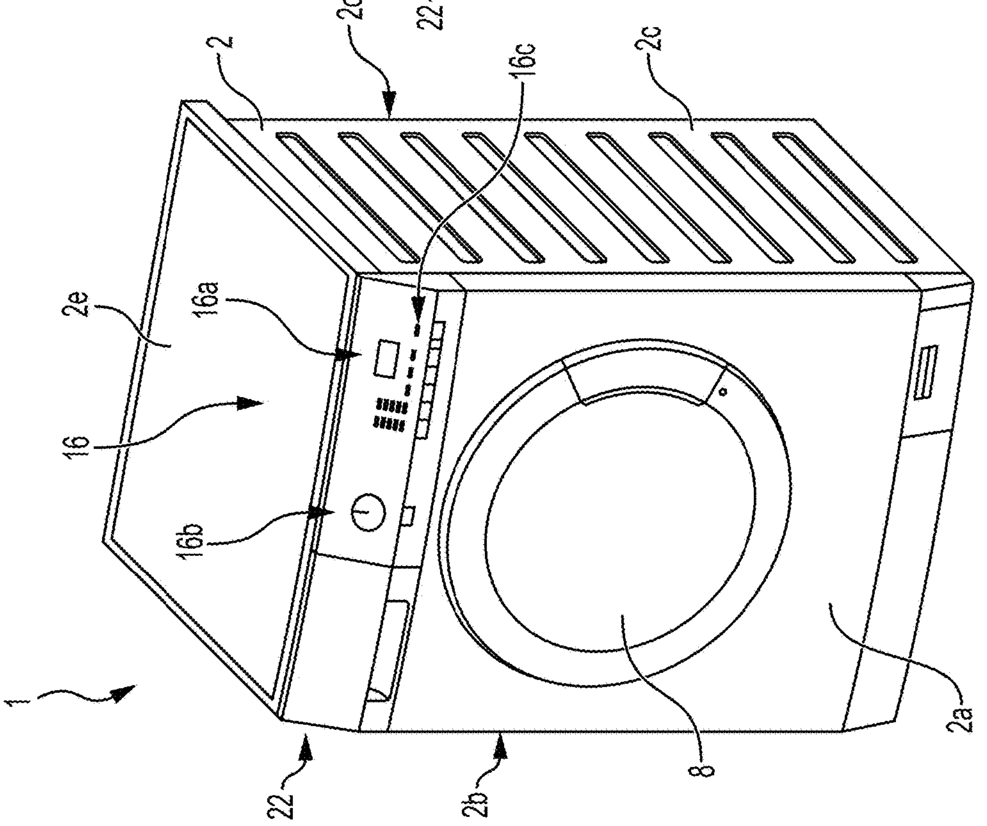
FIG. 1 shows a perspective view of a laundry washing machine in which a method according to a first embodiment of the invention is performed.
Figure 2:
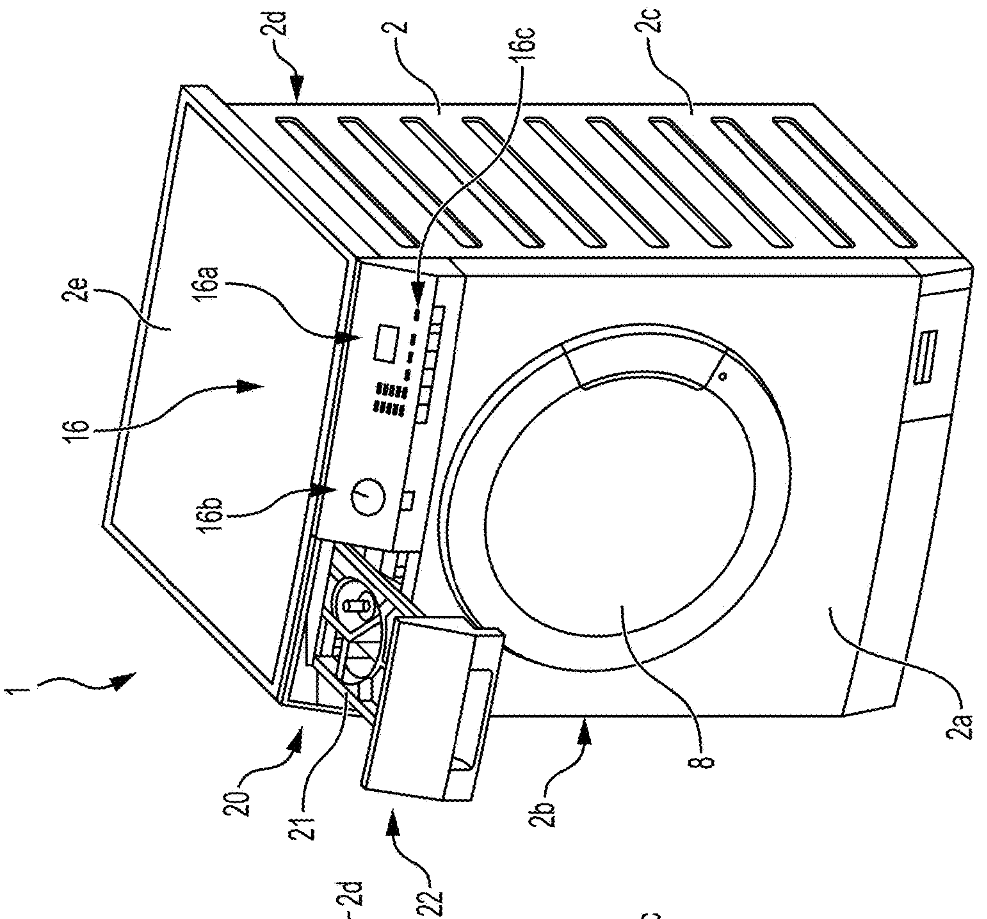
FIG. 2 shows the laundry washing machine of FIG. 1 with the drawer in its opened loading position.

The present invention has proved to be particularly advantageous when applied to laundry washing machines, as described below. It should in any case be underlined that the present invention is not limited to laundry washing machines. On the contrary, the present invention can be conveniently applied to laundry washing-drying machines (i.e. laundry washing machines which can also dry laundry).

In the present description, therefore, the term "laundry washing machine" will refer to both simple laundry washing machines and laundry washing-drying machines.

A laundry washing machine 1 where a method according to a preferred embodiment of the invention is performed is described with reference to FIGS. 1 to 12.

The laundry washing machine 1 comprises an external casing or cabinet 2, in which a washing tub 3 is provided that contains a perforated washing drum 4 where the laundry to be treated can be loaded. The external casing 2 comprises vertical side walls 2*a*-2*d* and an upper side wall 2*e*.

The tub 3 and the drum 4 both preferably have a substantially cylindrical shape. Between the tub 3 and the drum 4 a gap is defined.

The cabinet 2 is provided with a loading/unloading door 8 which allows access to the drum 4.

The tub 3 is preferably suspended in a floating manner inside the cabinet 2, advantageously by means of a number of coil springs and shock-absorbers 17. The drum 4 is advantageously rotated by an electric motor, not illustrated, which preferably transmits the rotating motion to the shaft of the drum 4, advantageously by means of a belt/pulley system. In a different embodiment of the invention, the motor can be directly associated with the shaft of the drum 4.

The drum 4 is advantageously provided with holes which allow the liquid flowing therethrough. The holes are typically and preferably homogeneously distributed on the cylindrical side wall of the drum 4.

The tub 3 is preferably connected to the cabinet 2 by means of an elastic bellows 7, or gasket. The bellows 7 is preferably S-shaped.

Figure 3:
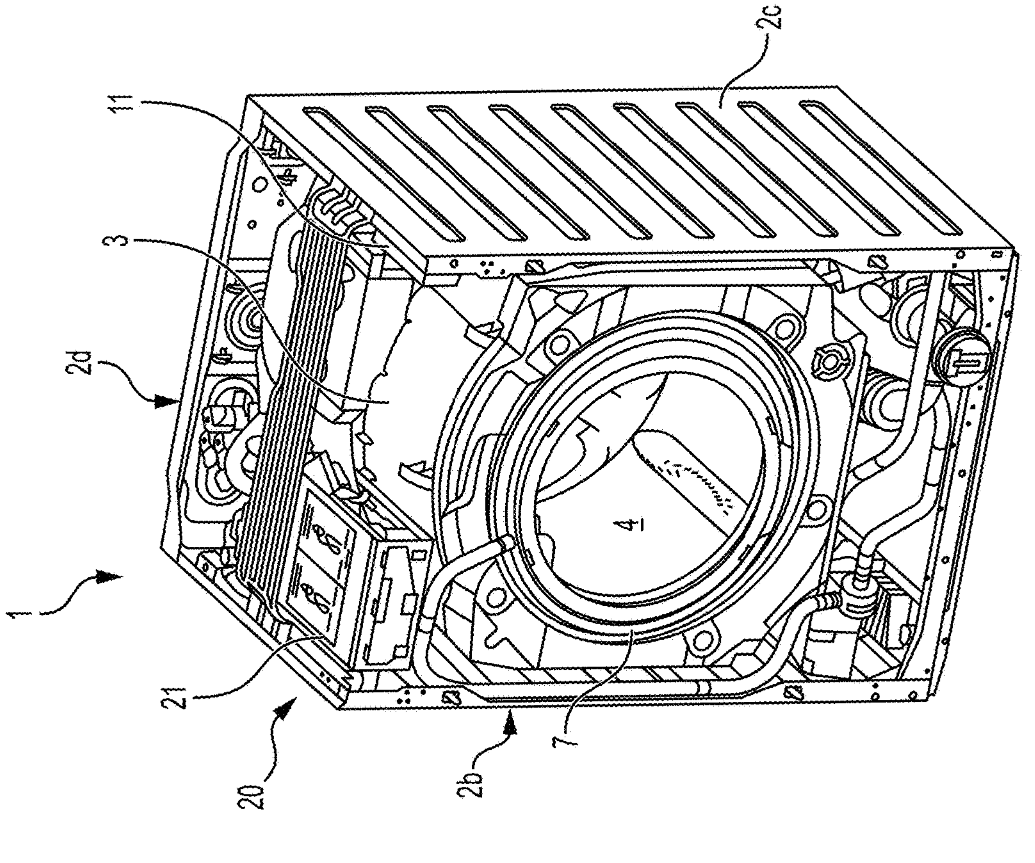
FIG. 3 shows the laundry washing machine of FIG. 1 with the front side wall and the upper side wall removed.

Laundry washing machine 1 advantageously comprises a control unit 11, for example illustrated in FIG. 3, connected to the various parts of the laundry washing machine 1 in order to ensure its operation. Laundry washing machine 1 preferably comprises an interface unit 16, connected to the control unit 11, accessible to the user and by means of which the user may select and set the washing parameters, like for example a desired washing program. Usually, other parameters can optionally be inserted by the user, for example the washing temperature, the spinning speed, etc. The interface unit 16 preferably comprises a display 16*a* which displays machine working conditions.

The unit interface 16 then preferably comprises one or more selector devices which allow to select the appropriate wash program and/or to set other parameters.

For example, the selector devices may comprise a selector 16*b* (a rotary knob) which advantageously allows selection of the appropriate wash program. The selector devices may then preferably comprise push buttons. In a preferred embodiment, one of the push buttons 16*c* is advantageously dedicated for selection of a program which uses a detergent pod, as will be described later. Thus, we can refer hereinafter to a "Pods cycle" button 16*c*.

In further preferred embodiments, the selection of the washing program which uses a detergent pod may be obtained through other selector devices, for example through the selector 16*b*.

In further embodiments, the selector devices may comprise other types of devices, such as capacitive switch, touch screen, etc. In a preferred embodiment, the touch screen may coincide with the display 16.

The laundry washing machine 1 advantageously comprises a treating agents dispenser 20 to supply treating agents into the tub 3 during a washing cycle. Treating agents may comprise, for example, detergents, rinse additives, fabric softeners or fabric conditioners, waterproofing agents, fabric enhancers, rinse sanitization additives, chlorine-based additives, etc.

Advantageously, the treating agents dispenser 20 comprises a box-shaped housing 21, connected to the external casing 2, internally to the latter, preferably by suitable fixing means, comprising, for example, screws or rivets, not illustrated, or also glue, or welding.

In the enclosed Figures, the housing 21 is advantageously substantially parallelepiped, and it is connected to the frontal side wall 2*a* of the external casing 2, opportunely in an upper region of the latter, positioned above the tub 3. The housing 21 contains a removable drawer 22 which can be extracted from the housing 21, such as to protrude from the external casing 2 in a opened loading position, as illustrated for example in FIGS. 2 and 5, or can be fully inserted into the housing 21 in an operative position, as illustrated for example in FIGS. 1 and 9.

The drawer 22 is provided with one or more compartments 23*a*, 23*b*, 23*c*, 23*d* adapted to be filled with treating agents.

In the embodiment illustrated in the Figures, there are four compartments, 23*a*, 23*b*, 23*c* and 23*d*.

The first compartment 23*a* is preferably adapted for receiving a powder detergent; the second compartment 23*b* is preferably adapted for receiving a quantity of liquid detergent; the third compartment 23*c* is preferably adapted for receiving a softener; the fourth compartment 23*d* is preferably adapted for receiving other treating agents, such as fabric conditioners, waterproofing agents, fabric enhancers, rinse sanitization additives, chlorine-based additives, etc. According to an advantageous aspect of the present invention, the first compartment 23*a* is preferably adapted for receiving also a unit dose package. With "unit dose package" it is meant a product comprising a pre-measured amount, or single dose, of treating agent incorporated into a water-soluble pouch.

In the preferred embodiment here described, the treating agent is detergent D. Hereinafter, therefore, the unit dose package will be simply indicate as "detergent pod DP".

Figure 5:
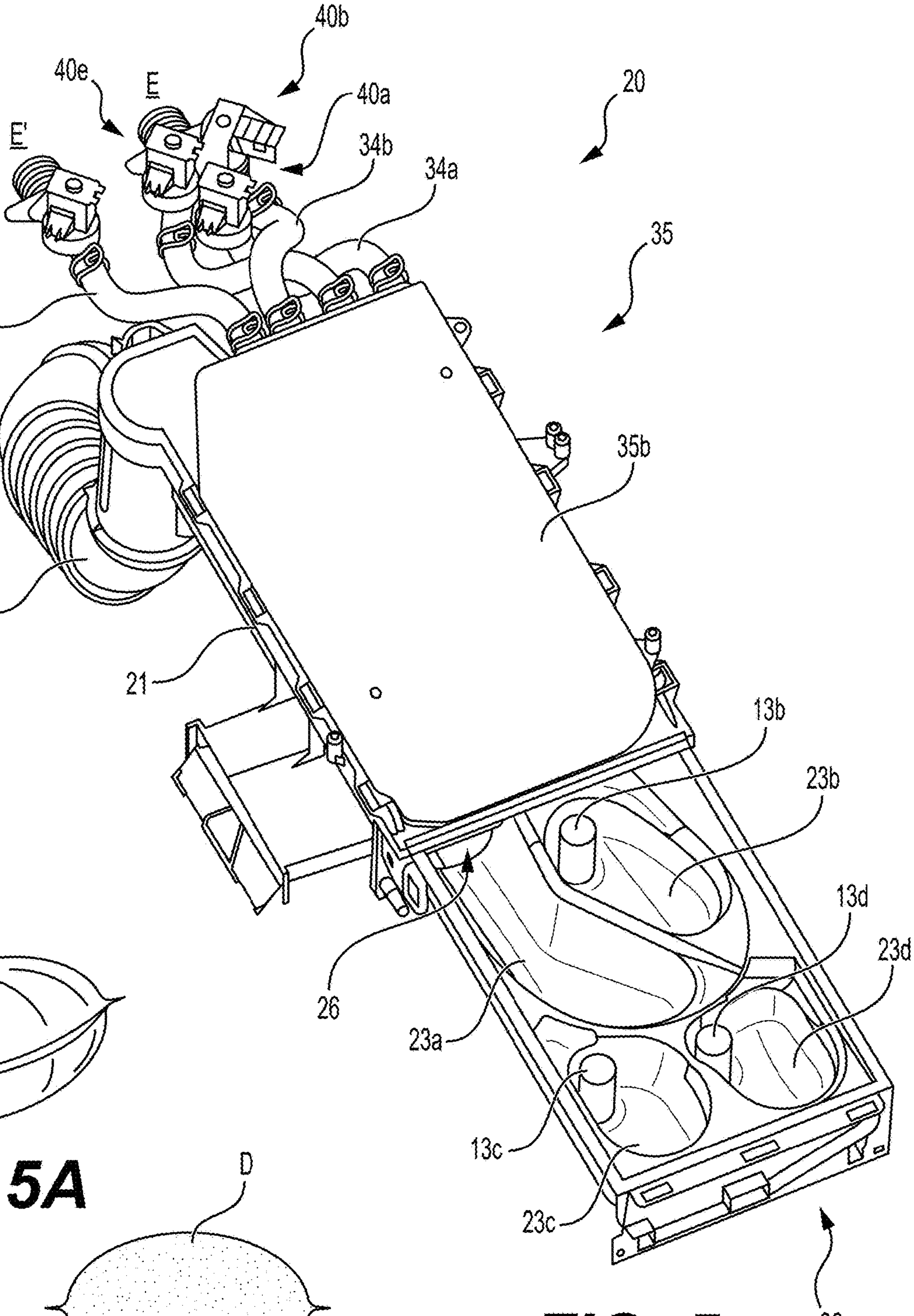
FIG. 5 is a prospective view of the treating agents dispenser, isolated from the rest, of the laundry washing machine represented in FIG. 2 with the drawer in its opened loading position.
Figure 5A:
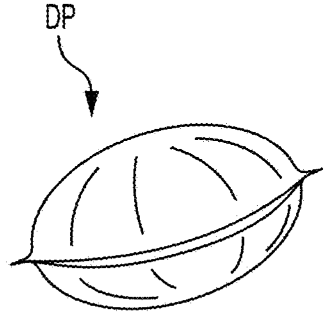
FIG. 5A shows a unit dose detergent usable in laundry washing machine represented in FIG. 1 and in the treating agents dispenser represented in FIG. 5.
Figure 5B:
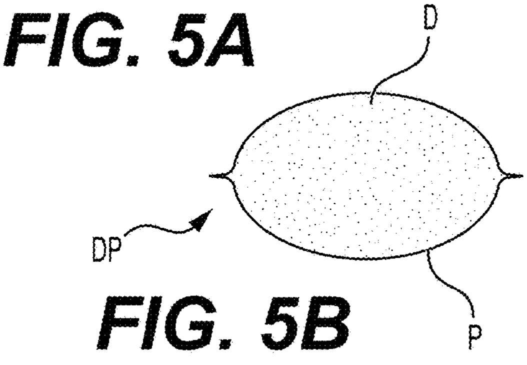
FIG. 5B is a sectional view of the unit dose detergent of FIG. 5A.
Figure 6:
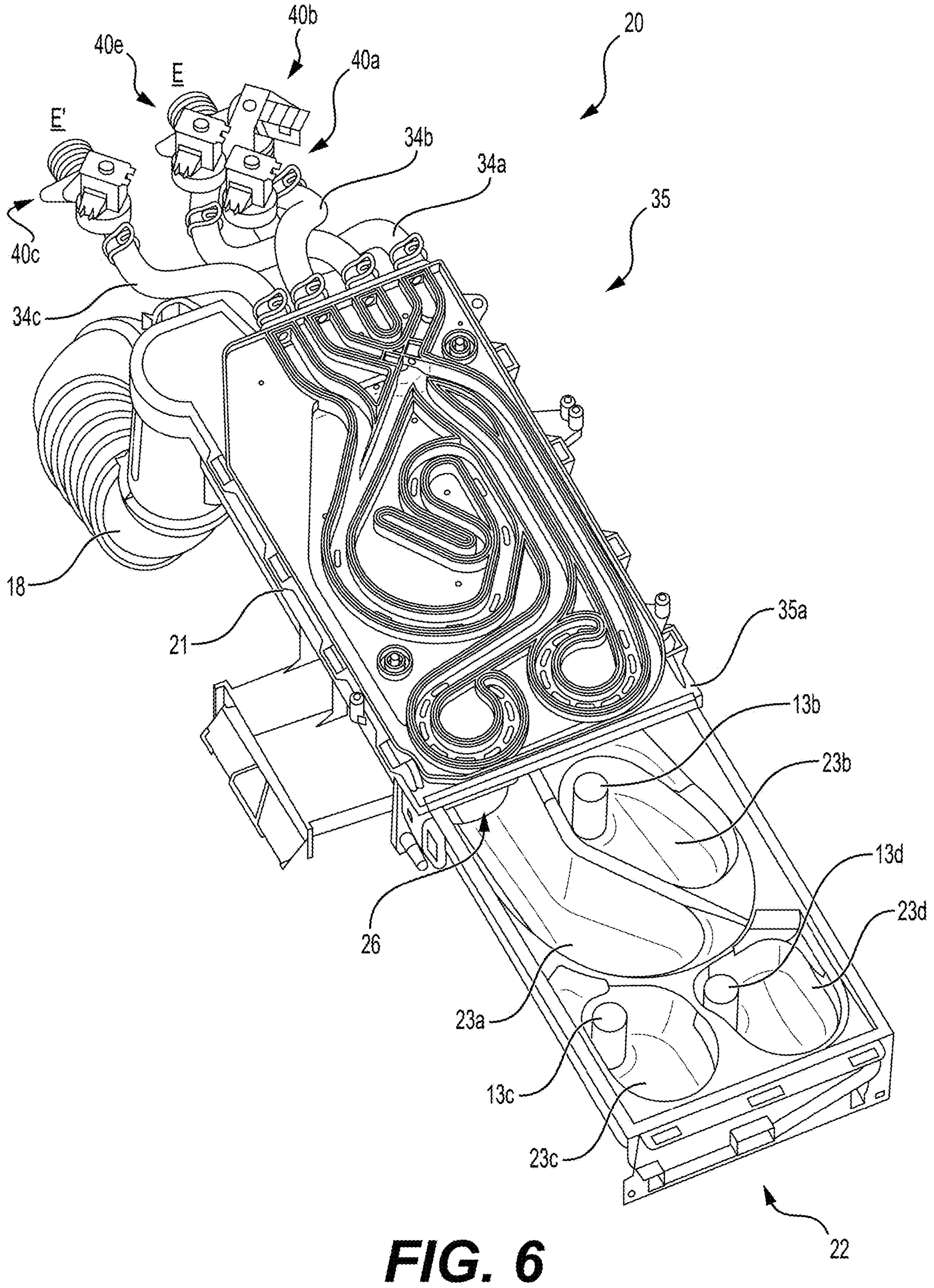
FIG. 6 shows the treating agents dispenser of FIG. 5 with an element removed therefrom.
Figure 7:
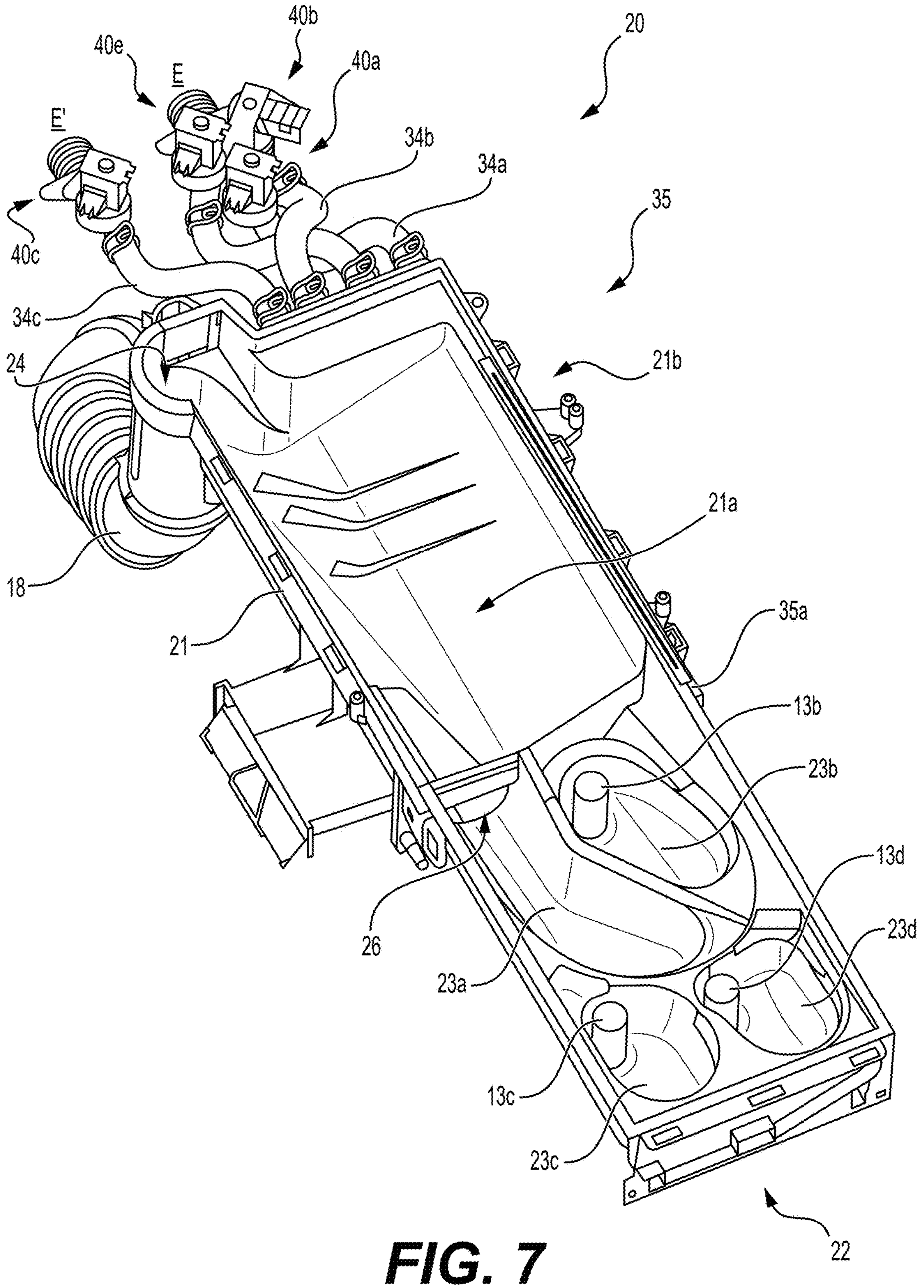
FIG. 7 shows the treating agents dispenser of FIG. 6 with a further element removed therefrom.
Figure 8:
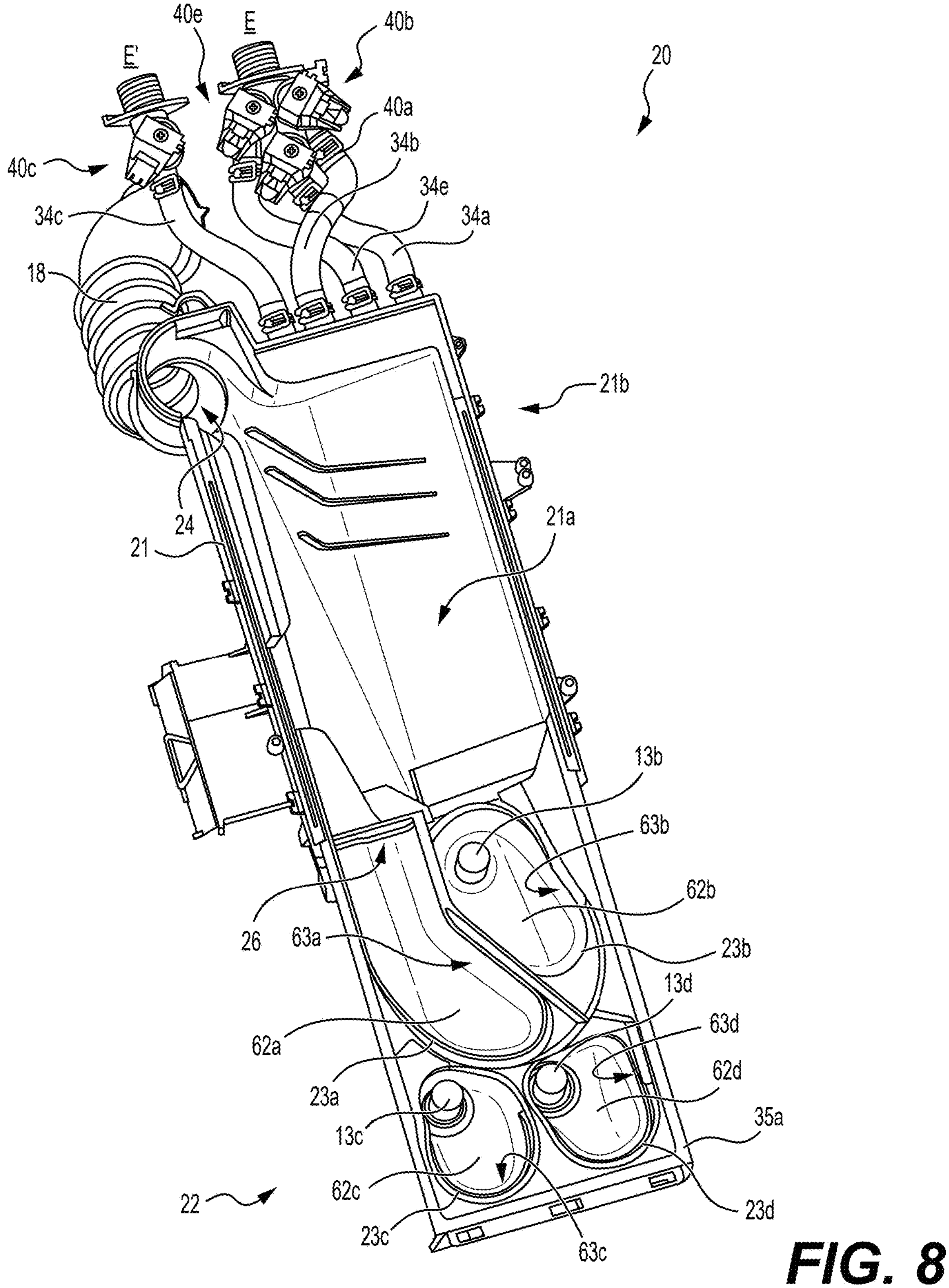
FIG. 8 shows the treating agents dispenser of FIG. 7 from a slightly different point of view.

For example, the detergent pod DP comprises a pre-measured amount, or single dose, of detergent D incorporated into a water-soluble pouch P, as illustrated in FIGS. 5A and 5B. Detergent D may comprise any type of detergent, for example powder, liquid, paste, waxy or gel compositions.

The pouch P preferably comprises a water-soluble film. In some examples, the liquid detergent products may be incorporated into a multi-compartment water-soluble pouch. The pouches may have a percentage of water-solubility, for example a water-solubility of at least 50%, preferably of at least 75% or more preferably at least 95%. Suitable pouch materials may include, but are not limited to, polymeric materials. In some examples, the polymers are formed into a film or sheet. The pouch material can, for example, be obtained by casting, blow-molding, extrusion or blown extrusion of the polymeric material, as known in the art.

Other polymers, copolymers or derivatives thereof suitable for use as pouch material may be selected from polyvinyl alcohols, polyvinyl pyrrolidone, polyalkylene oxides, acrylamide, acrylic acid, cellulose, cellulose ethers, cellulose esters, cellulose amides, polyvinyl acetates, polycarboxylic acids and salts, polyaminoacids or peptides, polyamides, polyacrylamide, copolymers of maleic/acrylic acids, polysaccharides including starch and gelatine, natural gums such as xanthum and carragum. In some examples, polymers are selected from polyacrylates and water-soluble acrylate copolymers, methylcellulose, carboxymethylcellulose sodium, dextrin, ethylcellulose, hydroxyethyl cellulose, hydroxypropyl methylcellulose, maltodextrin, polymethacrylates, and most preferably selected from polyvinyl alcohols, polyvinyl alcohol copolymers and hydroxypropyl methyl cellulose (HPMC), and combinations thereof. The level of polymer in the pouch material, for example a PVA polymer, may be at least 60%. The polymer can have any weight average molecular weight of from 1000 to 1,000,000, in some examples from 10,000 to 300,000, and in further examples from 20,000 to 150,000.

Mixtures of polymers can also be used as the pouch material. This can be beneficial to control the mechanical and/or dissolution properties of the compartments or pouch, depending on the application thereof and the required needs.

Suitable mixtures include for example mixtures wherein one polymer has a higher water-solubility than another polymer, and/or one polymer has a higher mechanical strength than another polymer. Also suitable are mixtures of polymers having different weight average molecular weights, for example a mixture of PVA or a copolymer thereof of a weight average molecular weight of 10,000-40,000, in some examples a weight average molecular weight of about 20,000, and of PVA or copolymer thereof, with a weight average molecular weight of 100,000 to 300,000, in some examples a weight average molecular weight of about 150,000. Also suitable herein are polymer blend compositions, for example comprising hydrolytically degradable and water-soluble polymer blends such as polylactide and polyvinyl alcohol, obtained by mixing polylactide and polyvinyl alcohol, typically comprising 1-35% by weight polylactide and 65% to 99% by weight polyvinyl alcohol. In some examples, polymers for use herein are from 60% to 98% hydrolysed, and in further examples from 80% to 90% hydrolysed, to improve the dissolution characteristics of the material.

It will be obvious according to one skilled in the art that different film materials and/or films of different thickness may be employed in making the compartments. A benefit in selecting different films is that the resulting compartments may exhibit different solubility or release characteristics.

The pouch material herein can comprise one or more additive ingredients. For example, it can be beneficial to add plasticisers, for example glycerol, ethylene glycol, diethyleneglycol, propylene glycol, sorbitol and mixtures thereof.

Other additives include functional detergent additives to be delivered to the wash water, for example organic polymeric dispersants, etc.

For reasons of deformability pouches or pouch compartments containing a component which is liquid will preferably contain an air bubble having a volume of up to 50%, alternatively up to 40%, alternatively up to 30%, alternatively up to 20%, alternatively up to 10% of the volume space of the compartment.

The compartments 23*a*, 23*b*, 23*c* and 23*d* are fluidly connected to the bottom 21*a* of the housing 21, particularly to the rear portion 21*b* of this bottom 21*a*, in which an outlet port 24 is obtained. The outlet port 24 is adapted to allow the flowing of a liquid into a supply pipe 18 fluidly connecting the treating agents dispenser 20 and the tub 3, as visible in FIG. 8.

Figure 4:
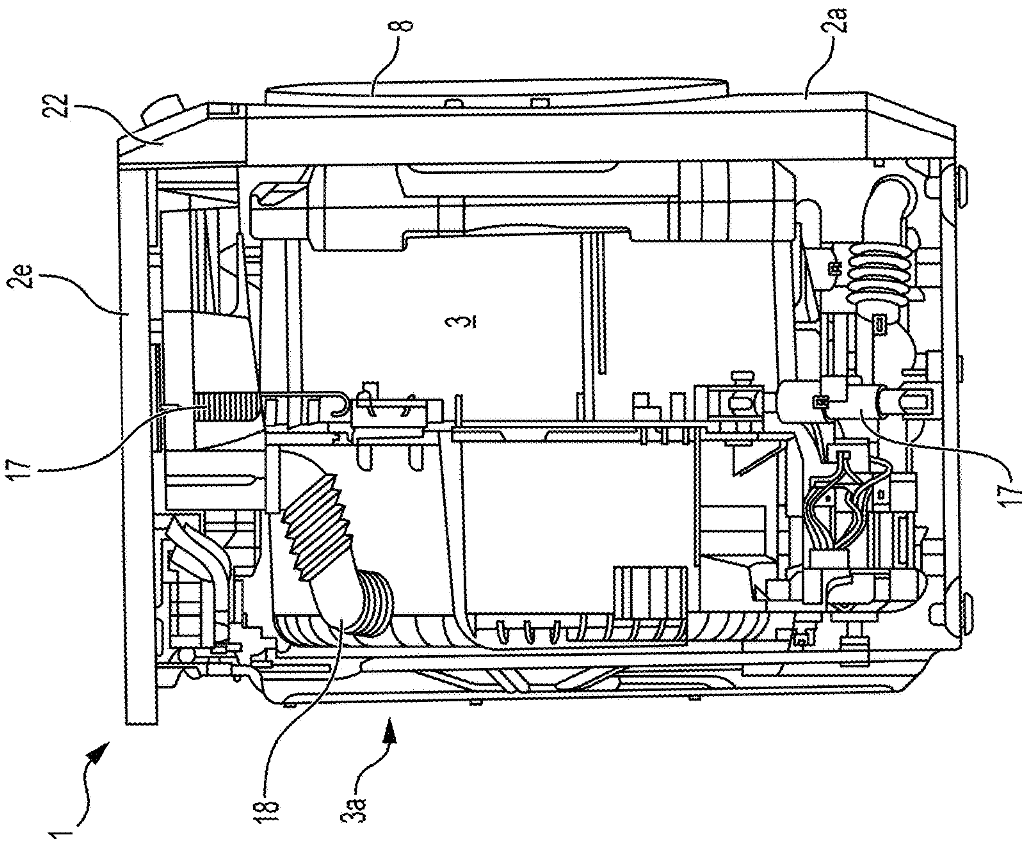
FIG. 4 shows a lateral plan view of the laundry washing machine of FIG. 1 with the left side wall removed.

The supply pipe 18, as illustrated in FIG. 4, is preferably arranged laterally with respect to the tub 3 and preferably terminates at an upper region 3*a* of the tub 3. More preferably, the supply pipe 18 terminates at a rear side of the tub 3.

The bottom 21*a* of the housing 21 preferably has a sloped bottom so that a fluid may flow towards the outlet port 24. The outlet port 24 is preferably located at the rear of the sloped bottom wall 21*a*.

It is underlined that in the present application saying that a first component is "fluidly connected" to a second component means that a fluid can flow from the first component to the second component and vice versa; on the contrary, saying that a first component is "fluidly separated" from a second component means that a fluid cannot flow from the first component to the second component or vice versa.

The first compartment 23*a* of the drawer 22 is fluidly connected to the bottom 21*a* of the housing 21 through an aperture 26 defined at the rear of the first compartment 23*a*.

The first compartment 23*a* preferably has a sloped bottom wall 62*a* so that a fluid may flow towards the aperture 26. The aperture 26 is located at the rear of the sloped bottom wall 62*a*.

According to an aspect of the invention, the first compartment 23*a* is suited to receive the detergent pod DP.

The other compartments 23*b*, 23*c* and 23*d* of the drawer 22 are preferably fluidly connected to the bottom 21*a* of the housing 21 through respective siphons 13*b*, 13*c*, 13*d*.

Advantageously, the treating agents dispenser 20 comprises a water distributor 35, associated to the housing 21 and placed above the drawer 22 in such a way to allow the flowing of water to one or more of the compartments 23*a*, 23*b*, 23*c*, 23*d*.

The treating agents dispenser 20 comprises one or more water conveying lines adapted for conveying water to one or more of the compartments 23*a*, 23*b*, 23*c*, 23*d*.

The water distributor 35 preferably comprises a lower part 35*a* and an upper closing part 35*b* structured for being reciprocally coupled to form the water distributor 35. The two parts 35*a*, 35*b* are preferably coupled by welding and/or gluing and/or joint.

Figure 9:
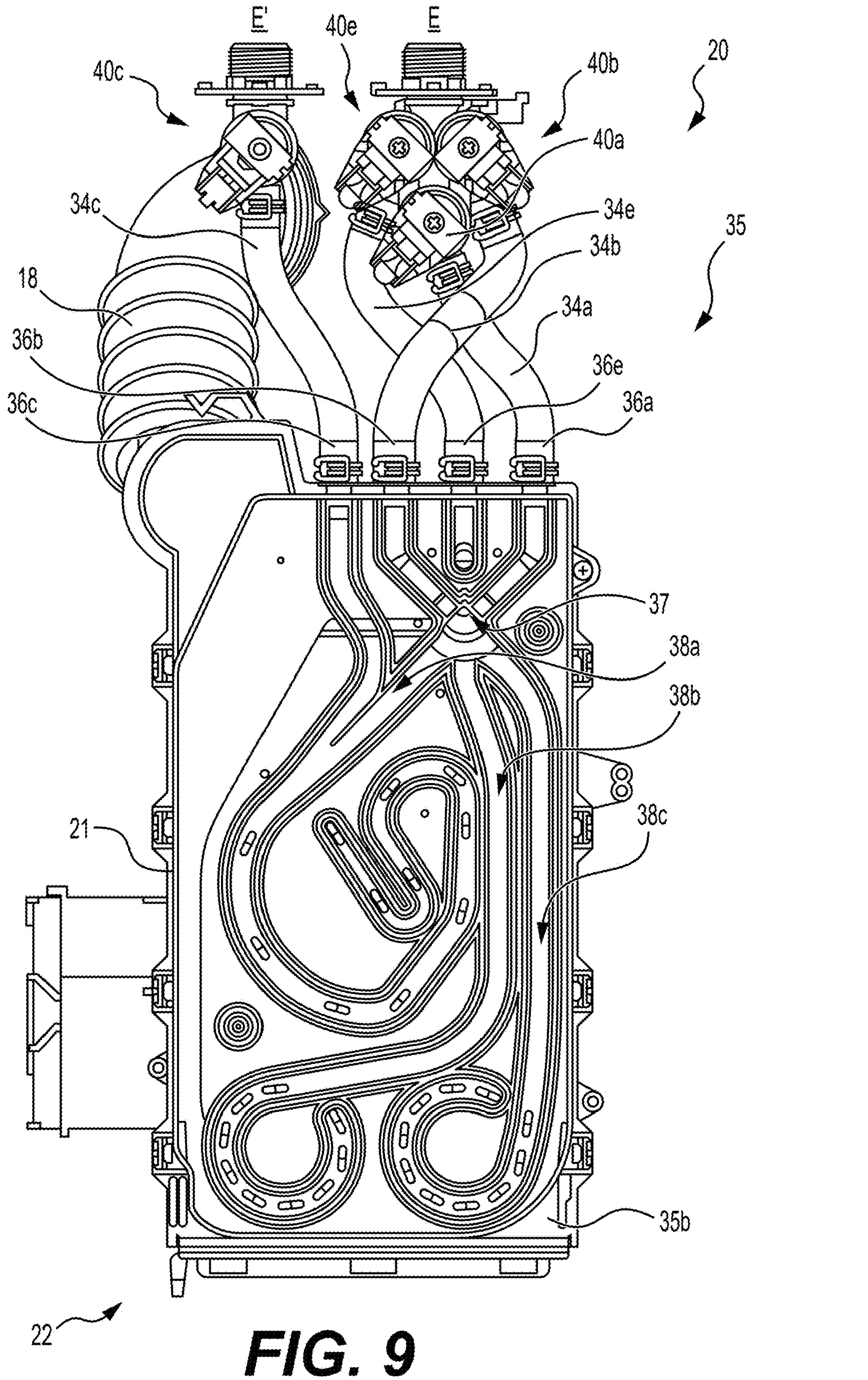
FIG. 9 is a plan view of the treating agents dispenser of FIG. 6 with the drawer in its closed position.

Advantageously, the water distributor 35 comprises a first and a second inlet connector 36*a*, 36*b* connectable to a water source E which could comprise, for example, the plumbing of the building in which the laundry washing machine 1 is installed, as better visible in FIG. 9.

Advantageously, the first and second connectors 36*a*, 36*b* can be connected to the water source E via first and second controllable valves 40*a*, 40*b*, preferably of the electromagnetic type, opportunely controlled by the control unit 11. In the embodiment illustrated in the enclosed Figures, the two inlet connectors 36*a*, 36*b* can be connected via the dedicated controllable valves 40*a*, 40*b*, to the water source E for the adduction of cold water.

Inlets of the two controllable valves 40*a*, 40*b* are connectable to the water source E and outlets of the two controllable valves 40*a*, 40*b* are connected, through respective pipes 34*a*, 34*b*, to the two inlet connectors 36*a*, 36*b* of the water distributor 35.

Preferably, the controllable valves 40*a*, 40*b* above described, and all the valves described hereinafter, comprise a regulator system that automatically cuts off the flow of water flowing therethrough at a certain maximum pressure. Preferably, the maximum pressure is set at a value comprises between 1.7 and 2.4 bar.

In the embodiment illustrated in the enclosed Figures there is also provided a third inlet connector 36*c* connectable, via a third controllable valve 40*c*, to a warm or hot water source E' (as visible in FIG. 9); the further inlet connector 36*c* can be fed with warm or hot water, for example obtained by a solar thermal collector; in a further embodiment, not illustrated, there could be more than one further inlet connectors, connected to one or more water sources.

Inlet of the third controllable valve 40*c* is connectable to the water source E' and outlet of the third controllable valve 40*c* is connected, through a respective pipe 34*c*, to the third inlet connector 36*c* of the water distributor 35.

Three ducts 38*a*, 38*b*, 38*c* are fluidly connected to the inlet connectors 36*a*, 36*b*. Each one of the three ducts 38*a*, 38*b*, 38*c* fluidly communicates with a different region 25*a*, 25*b*, 25*c*, 25*d* of the water distributor 35. Each region 25*a*, 25*b*, 25*c*, 25*d* is positioned in such a way to be placed above a respective compartment 23*a*, 23*b*, 23*c*, 23*d* of the drawer 22 when the latter is placed in its closed operative position.

Preferably, the inlet connectors 36*a*, 36*b* and the three ducts 38*a*, 38*b*, 38*c* are connected through a so called "air-break" 37, that is a safety system comprising an opening obtained in the water path in such a way to ensure that a stream of water can flow from the inlet connectors 36*a*, 36*b* to the three ducts 38*a*, 38*b*, 38*c* due to the water source pressure, while water can't flow from the ducts 38*a*, 38*b*, 38*c* to the inlet connectors 36*a*, 36*b*. In the embodiment illustrated, the "air-break" 37 advantageously comprises a lower opening 37*a*, better visible in FIG. 11.

The regions 25*a*, 25*b*, 25*c* and 25*d* of the water distributor 35 are provided with one or more outlets 29 that allow the passage of the water from the ducts 38*a*, 38*b*, 38*c* to the underlying compartments 23*a*, 23*b*, 23*c*, 23*d*.

Outlets 29 are preferably arranged in the water distributor 35 so that the water falling into the underlying compartments 23*a*, 23*b*, 23*c*, 23*d* hits the lateral side walls 63*a*, 63*b*, 63*c*, 63*d* of the respective compartment 23*a*, 23*b*, 23*c*, 23*d* and then flows towards the bottom side 62*a*, 62*b*, 62*c*, 62*d* of the respective compartment 23*a*, 23*b*, 23*c*, 23*d*.

Figure 12:
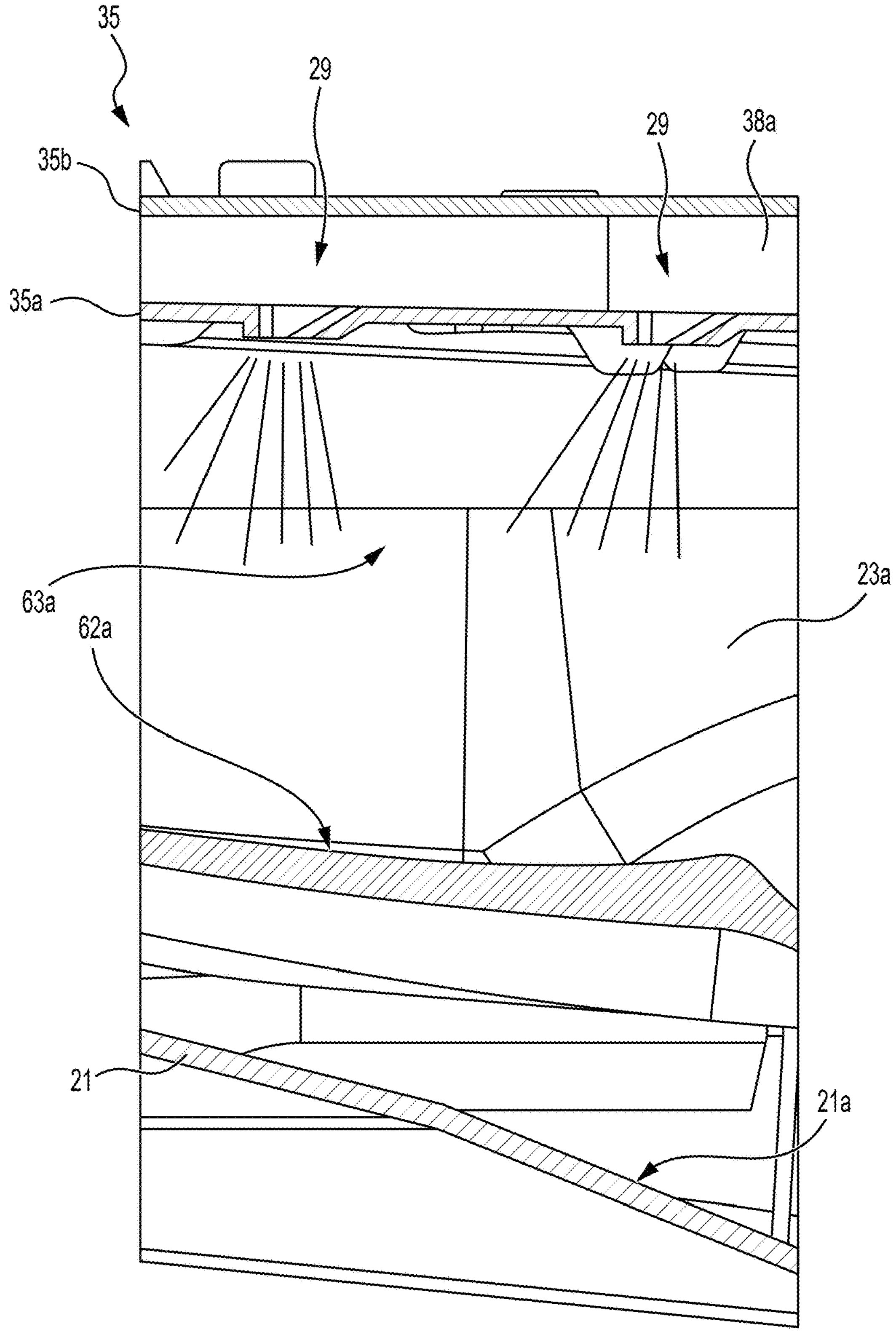
FIG. 12 shows a plan view of the treating agents dispenser of FIG. 10 sectioned along line XII0-XII0.

FIG. 12 illustrates a section view of two of the outlets 29.

Outlets 29 here illustrated allow the passage of water from the first duct 38*a* to the underlying first compartment 23*a*. Water spreading out from the outlets 29 hits the lateral side wall 63*a* of the first compartment 23*a* and falls down by gravity into the bottom 62*a* of the same. Advantageously, when the first compartment 23*a* is filled with powder detergent, the water drags the detergent towards the rear aperture 26 of the first compartment 23*a*. Furthermore, once all the detergent has been conveyed towards the rear aperture 26, the water hitting the lateral side wall 63*a* advantageously cleans the first compartment 23*a*. Analogously, the same cleaning effect for the other compartments 23*b*, 23*c*, 23*d* is obtained through outlets 29.

With reference to ducts 38*a*, 38*b*, 38*c*, they are advantageously defined between lower part 35*a* and the upper closing part 35*b* of the water distributor 35.

In particular, as will be better explained in the following, by acting on the controllable valves 40*a*, 40*b* and 40*c*, it is possible to selectively feed one of the ducts 38*a*, 38*b* and 38*c* and one or more compartments 23*a*, 23*b*, 23*c*, 23*d* with water coming from the water source E or E'.

Figure 9A:
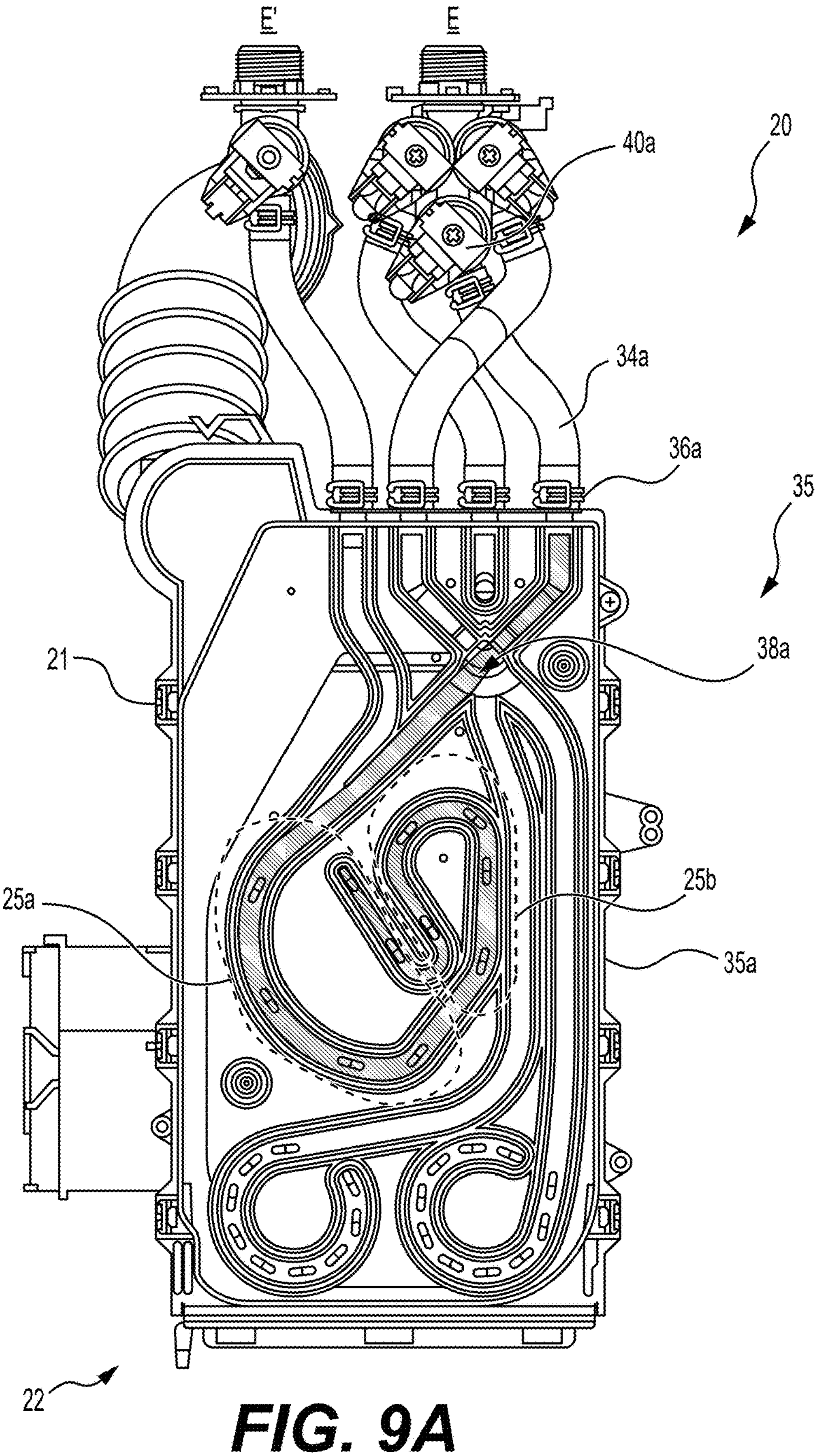
FIGS. 9A to 9D schematically illustrate different working conditions of the treating agents dispenser of FIG. 9.

More in particular, the first duct 38*a* communicates with two regions 25*a*, 25*b* of the water distributor 35 which are positioned above the first and second compartments 23*a*, 23*b*, as indicated in FIG. 9A.

Water is conveyed to the two compartments 23*a*, 23*b* of the drawer 22 by activating the first valve 40*a* and making the water flowing through the first duct 38*a* up to the regions 25*a*, 25*b*, as schematically indicated in FIG. 9A with grey path.

Figure 9B:
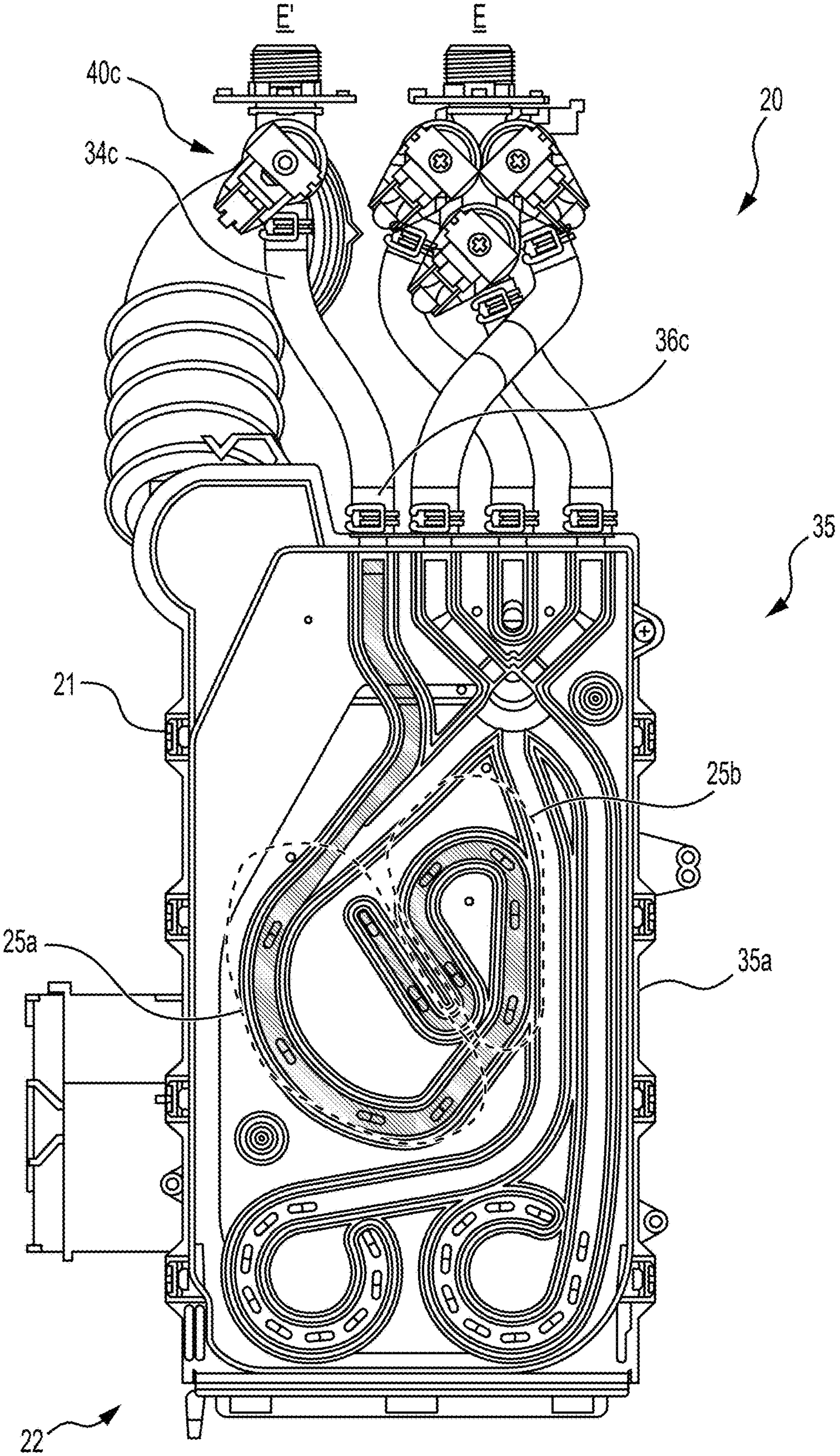

In the embodiment illustrated in the enclosed Figures also the further connector 36*c*, which can be fed with warm or hot water, is fluidly connected to the two regions 25*a*, 25*b* of the water distributor 35, in such a way to adduct also warm or hot water in the underlying first and second compartments 23*a*, 23*b*, as schematically indicated in FIG. 9B.

In a further preferred embodiment, not illustrated, the water distributor may comprise a dedicated duct and valve for each compartment, i.e. a duct communicating with the first region and another duct communicating with the second region.

The second duct 38*b* communicates with the third region 25*c* of the water distributor 35 which is positioned above the third compartment 23*c*.

Figure 9C:
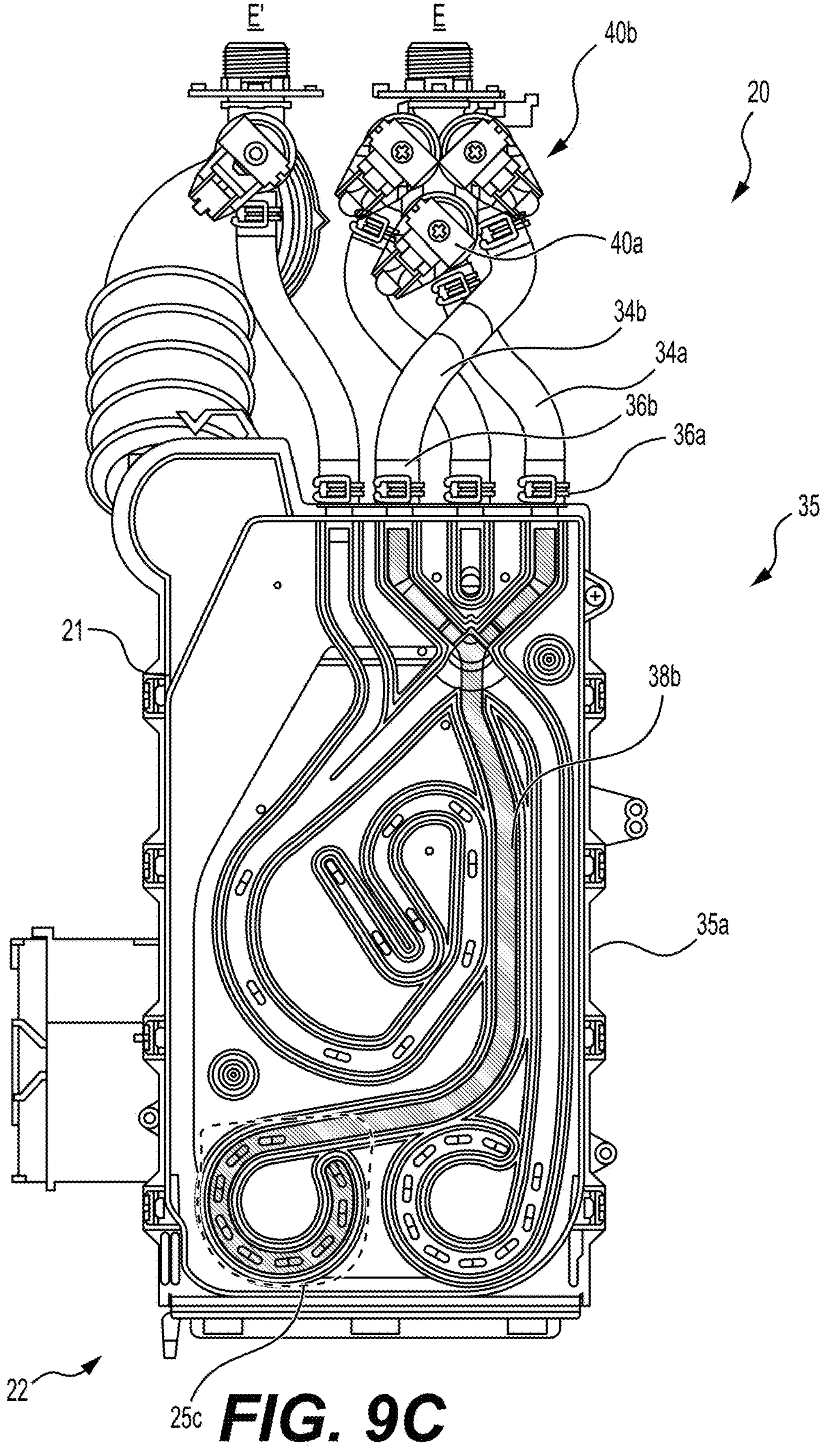

Water is conveyed to the third compartment 23*c* of the drawer 22 by activating simultaneously the first and second valves 40*a*, 40*b* and making the water flowing through the second duct 38*b* up to the third region 25*c*, as schematically indicated in FIG. 9C.

The third duct 38*c* communicates with the fourth region 25*d* of the water distributor 35 which is positioned above the fourth compartment 23*d*.

Figure 9D:
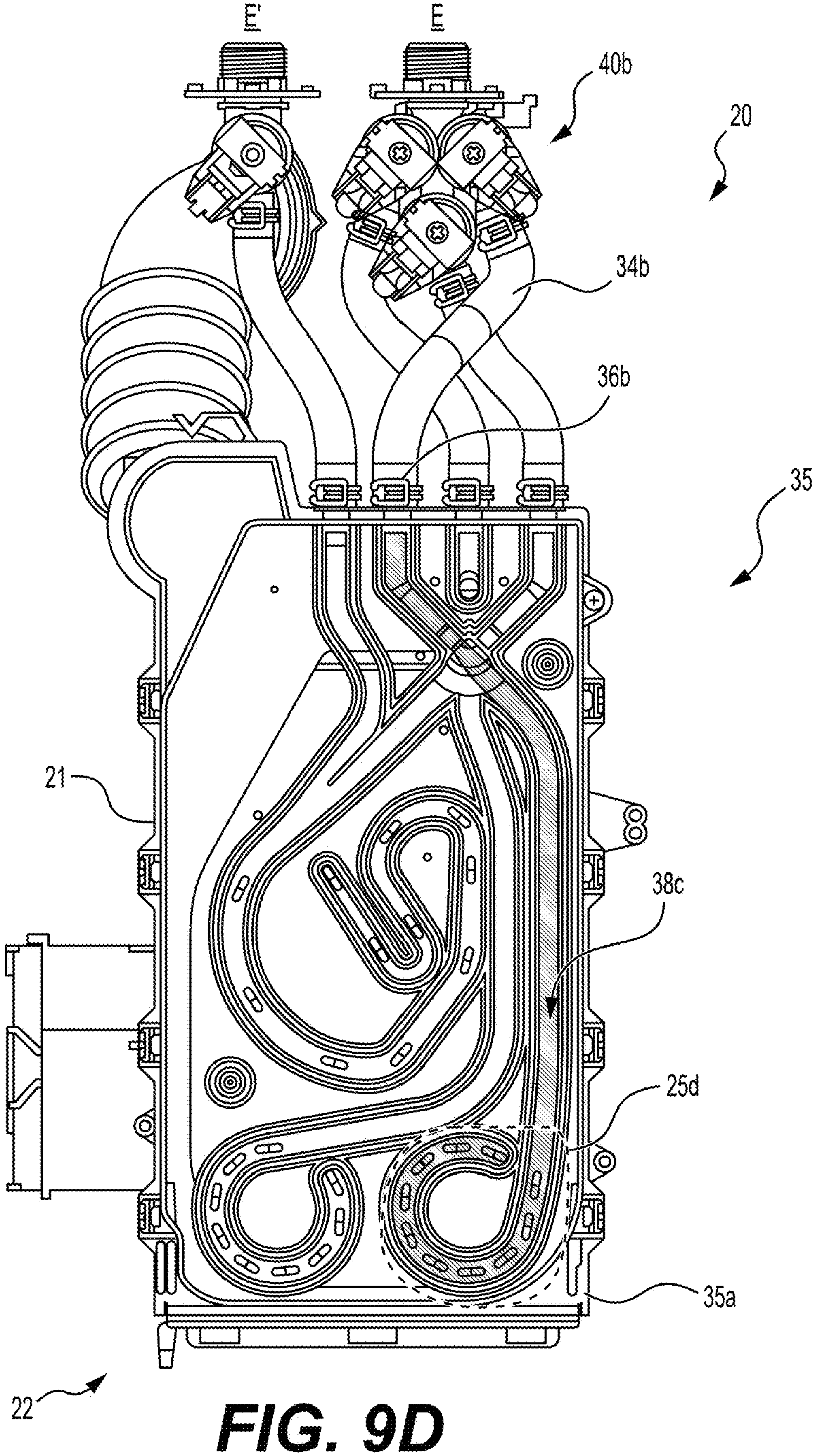
Figure 10:
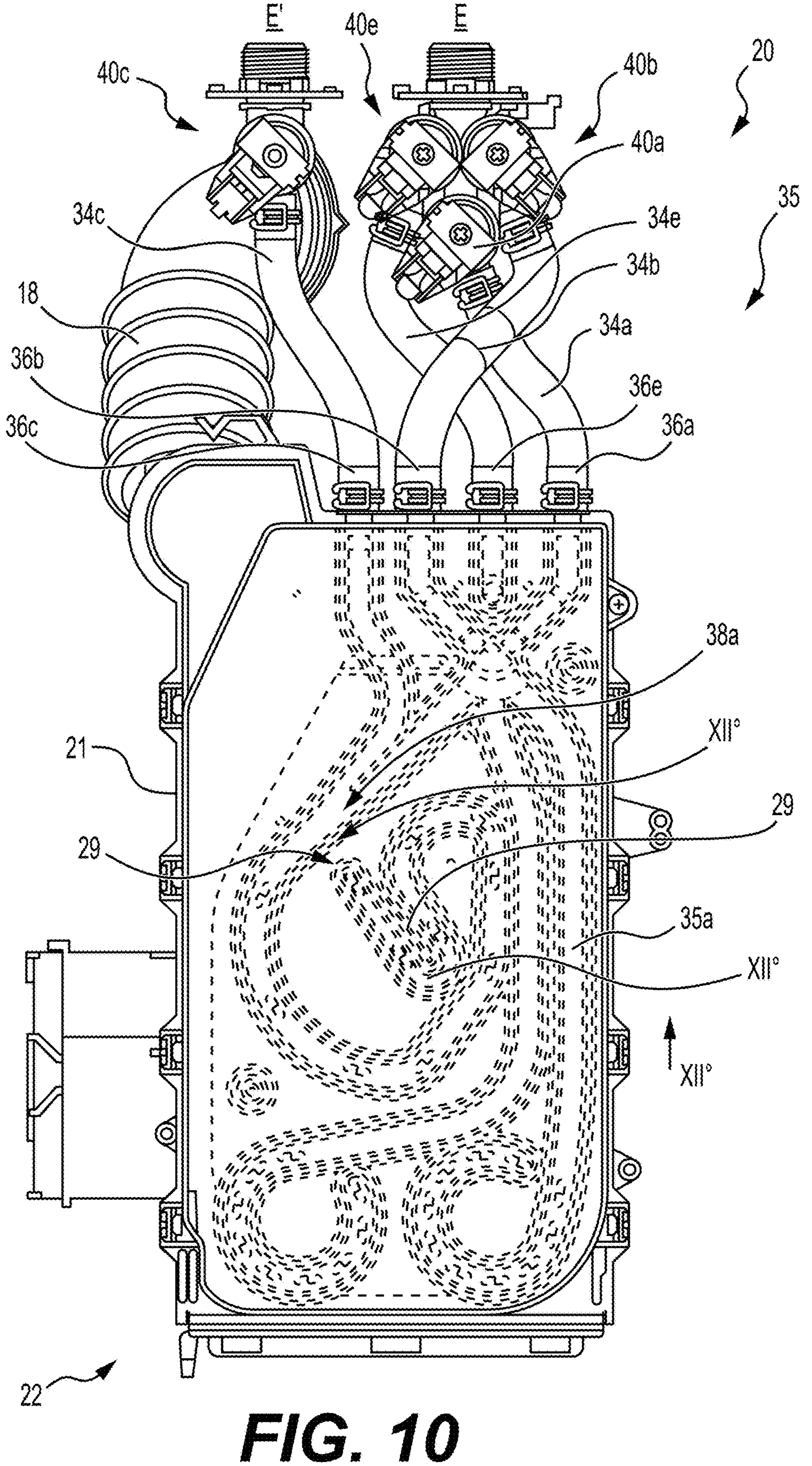
FIG. 10 is a plan view of the treating agents dispenser of FIG. 5 with the drawer in its closed position in which the underlying not visible components have been represented in dotted lines.
Figure 11:
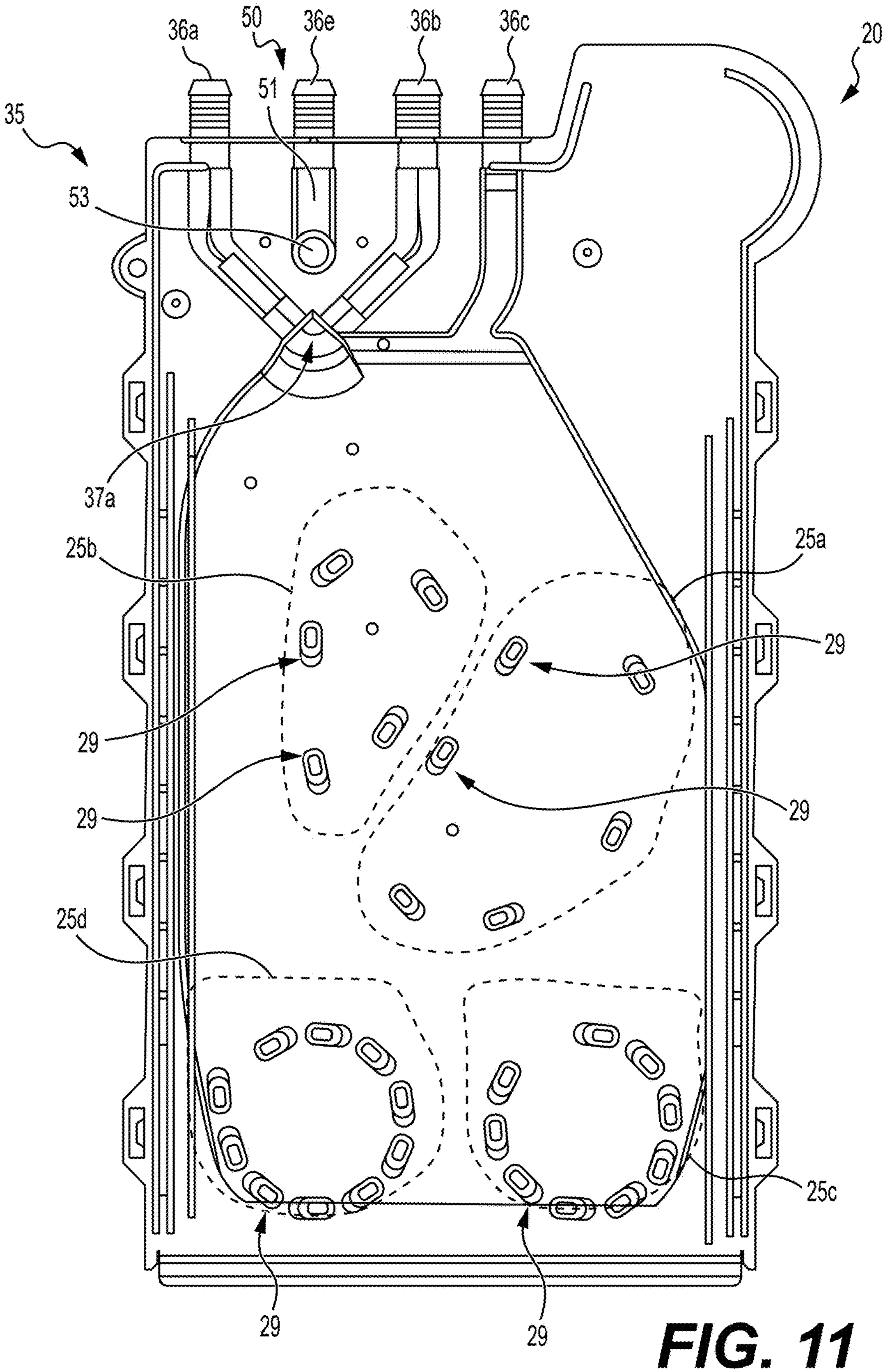
FIG. 11 shows a plan view, from below, of the upper part of the treating agents dispenser of FIG. 5.

Water is conveyed to the fourth compartment 23*d* of the drawer 22 by activating the second valve 40*b* and making the water flowing through the third duct 38*c* up to the fourth region 25*d*, as schematically indicated in FIG. 9D.

In another embodiment, not illustrated, in the drawer there can be more than four compartments, and in the water distributor there can be more than three ducts, each one fluidly communicating with a different region of the water distributor which is positioned in such a way to be placed above a different compartment of the drawer when the latter is placed in its closed operative position; also in this case, by acting on the controllable valves, it is possible to selectively feed a desired duct with water coming from the water source.

In further embodiments, not illustrated, in the drawer there can be less than four compartments, even just one, and in the water distributor there can be less than three ducts, each one fluidly communicating with a different region of the water distributor which is positioned in such a way to be placed above a different compartment of the drawer when the latter is placed in its closed operative position; also in this case, by acting on the controllable valves, it is possible to selectively feed a desired duct with water coming from the water source. Advantageously the treating agents dispenser 20 also preferably comprises a by-pass line 50, better visible in FIG. 11.

The by-pass line 50 comprises a conduit portion 51, obtained in a region of the water distributor 35 not intersected by the ducts 38*a*, 38*b* and 38*c*. The conduit portion 51 is opportunely fluidly separated from the compartments 23*a*, 23*b*, 23*c* e 23*d* and terminates with an opening 53, shown in FIG. 11, facing the underlying housing 21. The opening 53 is placed above the drawer 22 in such a way to allow the flowing of water directly to the bottom 21*a* of the housing 21 and outside the compartments 23*a*, 23*b*, 23*c*, 23*d* without entering the compartments 23*a*, 23*b*, 23*c*, 23*d*.

The conduit portion 51 communicates with an inlet connector 36*e* of the water distributor 35. The inlet connector 36*e* is fluidly connected, via a controllable valve 40*e*, to the water source E.

Inlet of the controllable valve 40*e* is connectable to the water source E and outlet of the controllable valve 40*e* is connected, through a respective pipe 34*e*, to the inlet connector 36*e*.

The by-pass line 50 is adapted to allow the passage of clean (or fresh) water from the water source E directly to the washing tub 3 by-passing the compartments 23*a*, 23*b*, 23*c*, 23*d* of the water distributor 35.

In different embodiments the by-pass line may not be present.

In an embodiment of the invention, the laundry washing cycle is advantageously carried out using powder or liquid detergent as known in the art. In this case, the first compartment 23*a* of the treating agents dispenser 20 is filled with powder detergent or the second compartment 23*b* is filled with liquid detergent. Then, advantageously, the third compartment 23*c* may be filled with a softener and/or the fourth compartment 23*d* may be filled with other treating agents, such as fabric conditioners, waterproofing agents, fabric enhancers, rinse sanitization additives, chlorine-based additives, etc. By operating on the interface unit 16 the user selects the desired washing program. The control unit 11 controls the laundry washing machine 1 so that it may start the washing program and dispensing, when required, the proper treating agent from the treating agents dispenser 20 to the washing tub 3.

The treating agent is dispensed from the treating agents dispenser 20 to the washing tub 3 by making flow an amount of flushing water into the proper compartment so as to flush out the treating agent contained therein and convey it into the washing tub 3 through the outlet port 24 and the supply pipe 18.

For example, the powder detergent is dispensed from the treating agents dispenser 20 to the washing tub 3 by making flow an amount of flushing water into the first compartment 23*a* so as to flush out the powder detergent contained therein and convey it into the washing tub 3 through the outlet port 24 and the supply pipe 18.

The washing cycle may then proceed with the following phases, such as water heating, drum rotation, draining phases, spinning cycles, etc., or further water loads.

According to a preferred aspect of the invention, the laundry washing cycle is advantageously carried out introducing a detergent pod DP inside the first compartment 23*a*. The third compartment 23*c* may be filled with a softener and the fourth compartment 23*d* may be filled with other treating agents, such as fabric conditioners, waterproofing agents, fabric enhancers, rinse sanitization additives, chlorine-based additives, etc.

In this case, the initial phase of the washing cycle is carried out using water and the detergent D of the detergent pod DP. The detergent D of the detergent pod DP is dispensed from the first compartment 23*a* to the washing tub 3, as will be described in the following.

The detergent pod DP is placed inside the first compartment 23*a* by the user and the drawer 22 is positioned in its closed operating position.

The method according to the invention comprises a step of conveying water, when required, to the first compartment 23*a* by activating the first valve 40*a* and making the water flowing through the first duct 38*a* and the first region 25*a*, as explained above and shown in FIG. 9A. In a different embodiment, the step of conveying warm or hot water, instead of cold water, to the first compartment 23*a* is carried out activating the third valve 40*c* and making the warm or hot water flowing through the first duct 38*a* and the first region 25*a*, as shown in FIG. 9B.

The water introduced inside the first compartment 23*a* through the outlets 29 advantageously pushes the detergent pod DP towards the aperture 26 of the first compartment 23*a* and then towards the outlet port 24 and the supply pipe 18.

The detergent pod DP then reaches the washing tub 3.

The washing cycle may then proceed with the following phases, such as water heating, drum rotation, draining phases, spinning cycles, etc., or further loads of water.

Tests carried out by the applicant have proved that placing the detergent pod DP inside the first compartment 23*a* of the drawer 22 leads to a more efficient washing cycle and to overcome drawbacks of the known art.

Advantageously and according to the method of the invention it is guaranteed that the detergent pod DP is conveyed into the washing tub 3 only at the correct time required by the washing cycle.

This solves the several drawbacks posed by the known art due to the insertion of the detergent pod inside the washing drum before starting of the washing cycle. In particular, the risk of undesired spots or stains on the laundry is limited. Also there is no risk that the detergent is drained to the outside in case the washing cycle starts with a draining phase.

Furthermore, during its movement from the first compartment 23*a* to the washing tub 3, advantageously, the water-soluble pouch P of the detergent pod DP starts to dissolve. The detergent pod DP is therefore broken and the detergent D is released before it reaches the washing tub 3 and the laundry contained therein. The dose of released detergent D previously contained in the detergent pod DP is therefore at least partially mixed with water before it reaches the laundry and it is more uniformly distributed over the laundry.

Advantageously with the method of the invention it is guaranteed that all the detergent D of the detergent pod DP is used during the laundry washing cycle and the whole cleaning effect of the unit dose detergent is therefore achieved. Furthermore, with the method of the invention the breakage of the detergent pod PD may advantageously happen before it reaches the laundry inside the washing drum. Therefore residual of the detergent pod DP in the laundry or inside the laundry washing machine, for example inside the bellows, is avoided.

This firstly further reduces risks of spots or stains on the laundry. The risk of presence of residual detergent in a successive rinsing phase is also reduced and the same rinsing is not negatively affected.

Advantageously, the indeterminateness of the effective time of breakage of the pod and the effective time of release of the detergent contained therein is eliminated and the performance of the washing cycle selected by the user is guaranteed.

Still advantageously, as described above, in the same laundry washing machine it is possible to perform either a washing program as known in the art, i.e. using powder or liquid detergent, or a washing program using a unit dose detergent.

Figure 13:
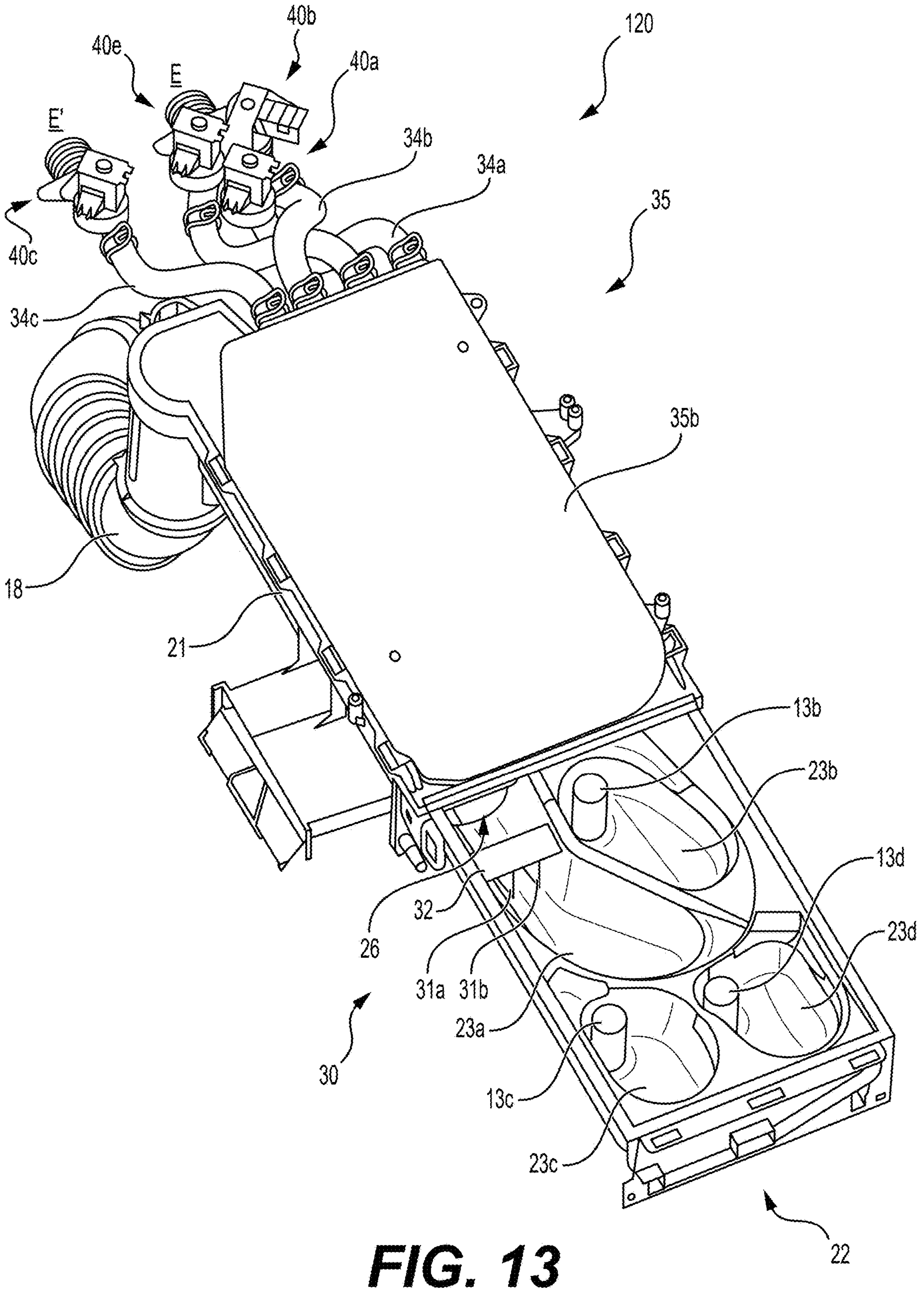
FIG. 13 illustrates another embodiment of the treating agents dispenser of FIG. 5.

The foregoing embodiment may be modified in various ways. For example, as shown in FIG. 13, a stopping device 30 may be provided in the first compartment 23*a* to hold the detergent pod DP to prevent it from passing through the rear aperture 26 until it is at least partially dissolved. It has been found that typical detergent pod DP pouch materials tend to adhere to the first compartment surfaces to prevent early release, but a stopping device 30 may be desirable in some instances if it is found that the detergent pod DP does not readily remain in place within the first compartment 23*a* for a suitable amount of time to effectuate breakage and/or dissolution of the outer pouch. This embodiment of FIG. 13 is otherwise the same as the previous embodiment, and like reference numbers are used to illustrate exemplary features.

For simplicity's sake, the term "break" is used to indicate the action of perforating or cutting the water-soluble pouch P of the detergent pod DP by a mechanical action of the water jet and not exclusively by dissolution of the pouch in contact with water.

Figure 14:
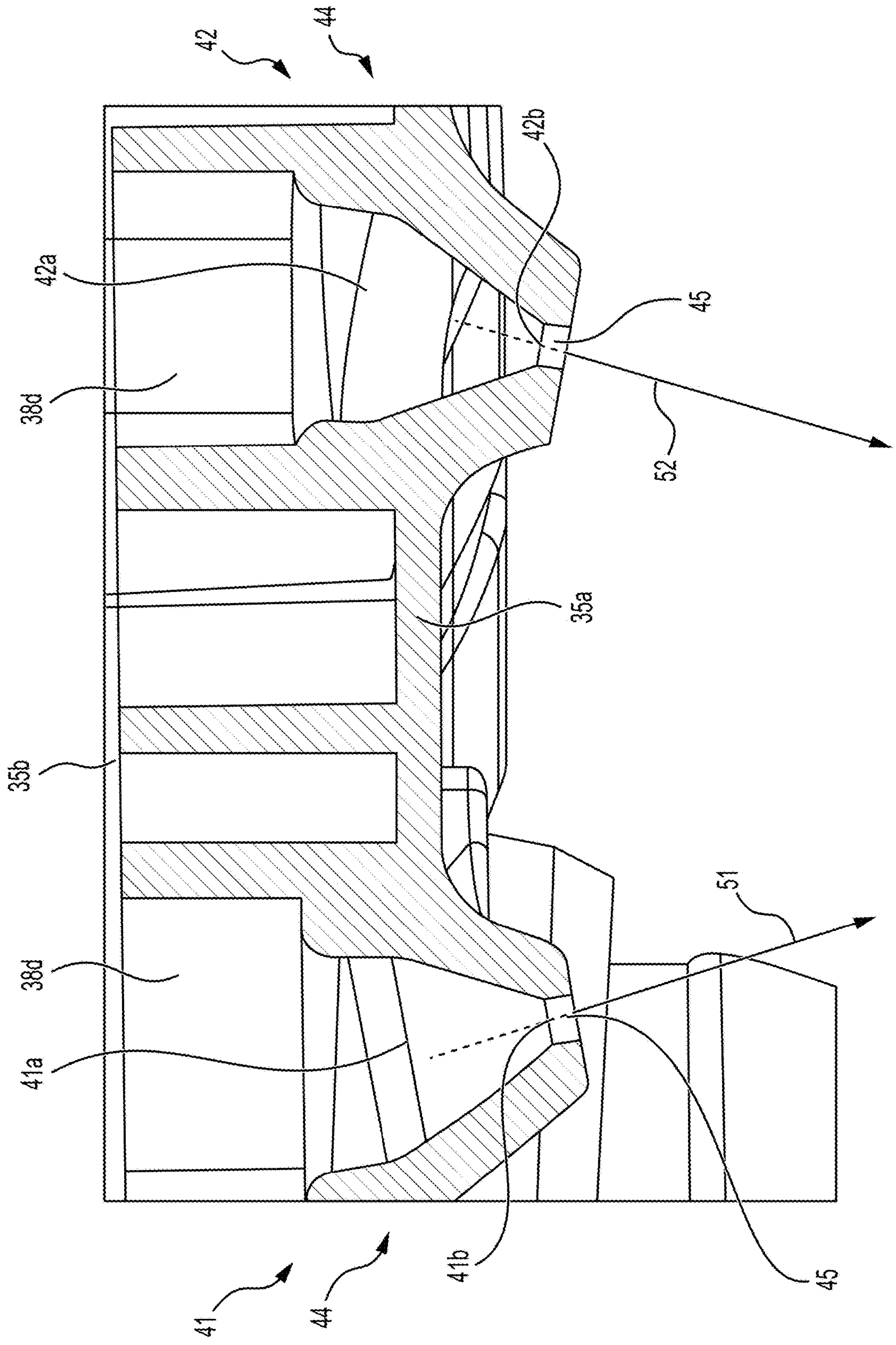
FIG. 14 shows a cross-sectional view of exemplary laminar flow jets.

In another embodiment, the treating agents dispenser may include nozzles that are shaped to generate a jet of water that helps break the water-soluble pouch P by a mechanical action. One or more of these nozzles may be located over the first compartment 23*a* to direct a concentrated stream of water onto the detergent pod DP. Such nozzles also may be provided with a separate source of water, such as an additional hose and valve to selective operate to pass water through these jets. Examples of such nozzles are shown in FIG. 14. Here, each nozzle 41, 42 is adapted to allow the passage of the water from a fourth duct 38*d* (which may be separate from the first, second and third ducts) to the underlying first compartment 23*a* and each nozzle 41, 42 is shaped such that it forms the water into a respective water jet 51, 52. The impact of the water jets against the detergent pod DP breaks its water-soluble pouch P.

The nozzles 41, 42 preferably have a first portion 44 and a second terminal portion 45. The first portion 44 preferably has a substantially frustum conical shape with a larger top section 41*a* (large section) and a smaller bottom section 41*b* (small section). The second terminal portion 45 preferably has a cylindrical shape. In the first portion 44 the water is forced from the larger section 41*a* to the smaller section 41*b* of the frustum and the water speed in increased. The second terminal portion 45 keeps the water speed and generates at its output the water jet 51, 52 with the required direction. Furthermore, the shape of the second terminal portion 45 guarantees that the water jet 51, 52 is a laminar-flow water jet. As a result, the water jet 51, 52 does not spread out and every part of the flow travels in a substantially straight line. The nozzles 41, 42 represent, therefore, laminar-flow nozzles.

It will be appreciated that nozzles of other shapes may be used in other embodiments, and the invention is not intended to be restricted to any particular structure of fluid nozzle.

Figure 15:
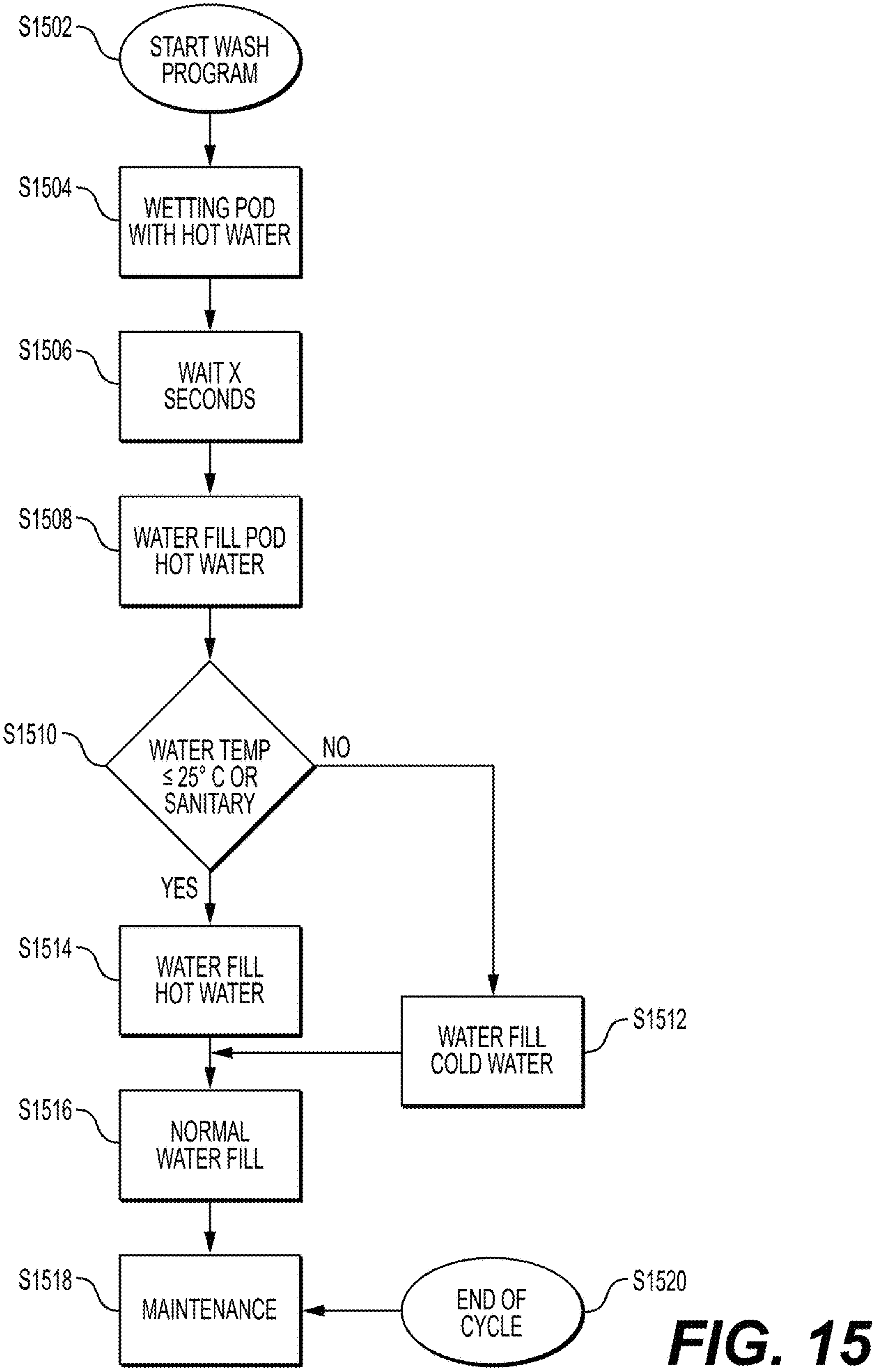
FIG. 15 is a flowchart illustrating a process for a washing cycle including a detergent pod (DP) selection in the laundry washing machine of FIG. 1.

FIG. 15 is a flow chart illustrating another process for a washing cycle including a detergent pod (DP) selection for the laundry washing machine of FIG. 1. The method for dispensing a solution comprising the detergent pod DP and water into the washing tub 3 is described below.

In this example of the invention, the laundry washing cycle is carried out using a detergent pod DP inserted into, for example, the first compartment 23*a* of the drawer 22 (shown for example in FIG. 5B) and the drawer 22 is closed. As discussed above, in the Figures of the application, there may be four compartments: 23*a*, 23*b*, 23*c*, and 24*d* of the drawer or dispenser 22 that are each arranged to receive a treating agent. The first compartment 23*a* may be configured to accept the unit dose, for example, a detergent pod DP containing a premeasured amount or a single dose of a treating agent. The first compartment 23*a*, as described above, preferably has a sloped bottom wall so that a fluid may flow through an aperture 26 defined at the rear of the first compartment 23*a*. However, the first compartment 23*a* may be further configured so that its shape accomplishes the function of stopping the detergent pod DP from moving in its pod form from the first compartment 23*a* to the washing tub 3, or it may have a stopping device 30. The treating agent, for example, detergent, from the detergent pod DP is dispensed from the first compartment 23*a* to the washing tub 3. The third compartment 23*c* may be filled with a softener and/or the fourth compartment 23*d* may be filled with other treating agents, such as fabric conditioners, waterproofing agents, fabric enhancers, rinse sanitization additives, chlorine-based additives, etc.

Beginning at S1502 of FIG. 15, the user selects a washing program having an initial phase that uses detergent pods DP (for example through selecting the "Pods Cycle" button 16*c* of the interface unit 16). When the Pods Cycle is initially selected by the user, the Pods Cycle becomes the default or automatic detergent selection for any additional washing loads for the laundry machine until the user deselects the Pods Cycle and selects another treating agent type option on the interface unit 16.

At S1504, water is conveyed to the first compartment 23*a* by activating (opening) controllable valve 40*c* that is connected to a warm or hot water source E' as illustrated, for example, in FIG. 9B. In the embodiment, hot water, for example about 0.2 L (0.05 gallon), flows from water source E' through pipe 34C to the inlet connector 36*c* into the region 25*a* of the first compartment 23*a*. The hot water may enter the first compartment 23*a* via laminar flow water jets schematically indicated with arrows 51 and 52 in FIG. 14 and described above, but other water inlets (e.g., a conventional arrangement of one or more inlet openings) may be used in other embodiments. The hot water wets or moistens the pouch or membrane of the detergent pod DP which causes the membrane to slowly dissolve.

At S1506, the water flow is terminated and the water continues to moisten the membrane for a predetermined period of time. During this waiting step, no water is added to the membrane. Water that was added in step S1504 will be absorbed by the detergent pod DP, flow out of the chamber and/or sit at the bottom of the chamber. The predetermined time may vary in different embodiments, and may be adjustable based on the properties of the detergent pod DP membrane. For example, the predetermined time may be 30 seconds to provide a desired degree of softening of the membrane. In other cases, the predetermined time may be 20 seconds or 10 seconds. For membranes that are more easily dissolved, a shorter duration may be selected, and vice versa for membranes that are more difficult to dissolve. The laundry washing machine also may include an adjustable timer that can be operated if it is discovered that portions of the membrane remain in the laundry after the wash. During this period of time, the detergent pod DP remains generally stationary within the first compartment 23*c*, and the membrane continues to dissolve.

At S1508, additional hot water, for example, about 2 liters, flows from water source E' to the chamber. This flow of water may be provided by, for example, water jets 51, 52 that are positioned over the detergent pod DP in the first compartment 23*a* to directly hit the detergent pod DP with one or more "shots" or "bursts" of water in order to break the dissolving water-soluble membrane pouch containing the unit dose detergent. In this example, the impact of the water jets against the dissolving detergent pod DP membrane breaks the water-soluble pouch. The action of breaking or perforating or piercing the pouch with the longer "shots" or "bursts" of water is intended as an action of breaking the pouch by a mechanical action of the water jet, and not exclusively by dissolution of the pouch in contact with the water. In other embodiments, the water added in step S1508 may be via other fluid inlets, such as one or more conventional water inlets. In this case, the water may not specifically penetrate or break the membrane by mechanical action, but it is still expected to accelerate the opening of the detergent pod DP membrane. Thus, it is not required in all embodiments for the detergent pod DP to be opened by breaking the membrane, and simple dissolution may be performed in some embodiments. After the pouch of the detergent pod DP is broken or otherwise opened, the dose of detergent is released and flows into the washing tub 3.

At S1510 a logical selection process is performed to determine whether to add hot or cold water depending on the current temperature of water in the tub 3. In this process, the temperature of the water in the washing tub 3 is measured and its value is saved to a memory of the control unit 11 (FIG. 3). If the measured water temperature is less than or equal to a predetermined value, such as 25° C., then the process continues to S1514. At S1514, hot water, for example, 2 liters (0.53 gallon), from the water source E' is supplied to the washing tub to increase the temperature of the water in the washing tub 3. After the hot water is added, the process continues to S1516.

If the measured temperature of the water at S1510 is greater than the predetermined value (e.g., 25° C.), then at S1512, cold water, for example, 2 L (0.53 gallon) from the water source E is supplied to the washing tub 3 to cool the water temperature. This may be useful to help prevent stains from setting in the laundry. After the cold water is added, the process continues to S1516.

The logical selection process in step S1510 also may be modified to depend on the particular operation cycle in which the laundry washing machine is operating. For example, the process may include an additional evaluation of whether or not a predetermined operation mode (e.g., an optional Sanitary cycle or warm/hot water cycle) has been selected by the user for the washing program. If the predetermined operation mode, such as a Sanitary cycle, has been selected, the process proceeds to step S1514 and bypasses step S1512, regardless of whether the water temperature is less than or equal to the predetermined temperature.

At S1516, one or more of the valves 40*a* or 40*c* are activated for a predetermined period of time, for example 60 seconds, to complete a normal filling of water into the washing tub 3. The water fill level in the washing tub 3 may be based upon an amount of laundry load in the washer and/or the washing program selected by the user, or based on other factors (e.g., it may be a fixed value for all operations). The operation of the valves may be selected to provide a desired final temperature of the water, based upon the wash program selected by the user at the user interface 16, and connection to water source E or E' (discussed above), wherein in the example water source E supplies cold water, and water source E' supplies hot water. The selection of E and E' for connection to cold/hot water is exemplary and could be switched by the user of the laundry washing machine. After the normal filling of the water into the washing tub 3, the washing cycle proceeds in accordance with the selected cycle such as drum rotation, draining phases, spinning cycles, rinsing phases etc., or further water loads. The process continues to S1518.

At S1518, a sensor (not illustrated) within the washing tub 3 monitors the water level to ensure and maintain proper water levels based upon the selected wash program. During the wash cycle, the clothing or laundry within the washing tub 3 may absorb water or there may be a leak. The sensor within the washing tub 3 is configured to detect the reduced water level and can transmit a signal to a control unit at the interface 16 to refill water to maintain the water levels when the water is absorbed by the laundry, or transmit a signal to the control unit to indicate an error when there is a leak.

At S1520, the process ends after each phase of the selected washing program is complete and the proper water levels are maintained during the washing program.

It is clear that times and volumes expressed above are only indicative and depend on various parameters, and in particular on the pressure of the water coming from the water source E or E', which may typically vary over time or from a house to another where the laundry washing machine is installed.

The method according to the examples of the invention has been advantageously described in particular with reference to a detergent pod DP, but it has to be noted that the method may also be performed when a different unit dose package is utilized. For example, the method may be advantageously performed for distributing a softener on the laundry in a particular phase of the washing cycle. In such a case, the method according to the invention preferably comprises at least a step of introducing the softener pod into the dedicated compartment of the treating agents dispenser, a softener pod breakage step of breaking the pouch of the softener pod and a step of conveying the dose of softener inside the washing tub. The unit dose package is constituted of a unit dose softener comprising a pre-measured amount, or single dose, of softener incorporated into a water-soluble pouch. The pouch, as described above, is preferably made of a film material that is soluble or dispersible in water.

The same philosophy may analogously apply to other types of unit dose packages which have to be dispensed during a washing cycle.

As noted above, in one aspect of the invention, the laundry washing machine may include various selector devices for receiving user input. Such devices may include, for example, a selector 16*b* in the form of buttons or a rotary knob to allow selection of the appropriate wash cycle (as used hereinafter, a "cycle" is a complete set of operations for processing a single load of laundry within the machine), and one or more buttons or knobs that allow the user to modify parameters of the selected cycle (e.g., wash time, dirt level, load level, water temperature, etc.). Also as noted above, one selector device, such as a push button 16*c* (e.g., a Pods cycle button 16*c*), may be dedicated for selection between a default detergent mode and a detergent pod mode.

The detergent mode is selected based on the type of detergent that is being provided to the laundry washing machine, and the machine is operated differently for different types of detergent. In particular, the detergent mode controls how the laundry washing machine dispenses water into the machine. For example, in a default detergent mode, the machine may dispense a predetermined volume of water into a detergent compartment 23*a* via one or more spray nozzles in a continuous stream (i.e., the water is all dispensed at once), whereas in a detergent pod mode the machine may dispense water according to a series of steps (or by particular inlet nozzles) intended to pierce a unit dose package outer pouch, such as described in embodiments discussed above. Thus, the operating parameters, such as the water loading procedure, for the default detergent operation mode is different from the operating parameters for the unit dose package operation mode.

In a typical laundry washing machine, the various user inputs reset to default functions after each operation of the machine. For example, a typical rotary knob selector 16*b* returns to a "normal" operation cycle following each completed washing cycle and upon each new power-up of the machine. This functionality is desirable to prevent accidental use of inappropriate cycles, and is generally desirable because users typically separate laundry loads according to the type of washing cycle they are to receive (e.g., separating colored clothing from white clothing, separating heavily-soiled clothing from lightly-soiled clothing, etc.). Thus, it is desirable to default to a general purpose cycle between loads in order to mitigate issues that might arise if a user fails to change the cycle when putting in a new laundry load.

Despite the recognized benefits of resetting the washing cycle to a default mode after each load, it has been found that programming a dedicated detergent pod cycle input to remain active after each load can provide improved machine performance. For example, a laundry washing machine having a user input corresponding to a unit dose package operation mode control may be programmed to operate by deactivating a default detergent operation mode and activating a unit dose package operation mode in response to receiving a first selection of the unit dose package operation mode control from the user input. Afterwards, the laundry washing machine will perform complete washing cycles in the unit dose package operation mode without receiving a further selection of the unit dose package operation mode from the user input. Thus, the unit dose package operation mode is "persistent" across multiple wash cycles. However, when the machine receives a second selection of the unit dose package operation mode control from the user input, it returns to the default detergent operating mode.

While the machine is in the unit dose package operation mode, a dedicated detergent pod cycle button 16*c* on the machine may remain active to indicate that this mode is selected. For example, a visual indicator such as a light embedded in the button may remain lit until the user manually turns off this input by selecting it a second time.

The pod cycle input also may remain active after the user changes other user inputs or selects other options. For example, the unit dose package operation mode may remain active after the machine power state cycles between the on and off conditions, so that this mode (if previously selected) will be used when the machine is turned on, without further input from the user. Similarly, the unit dose package operation mode also may remain active after the machine receives instructions to change from one washing cycle to a different washing cycle. For example, the unit dose package operation mode may remain active after a user operates a rotary knob selector 16*b* or other user inputs to change the cleaning cycle (e.g., changing from a "normal" mode to a "delicates" mode) or to change parameters of a particular cleaning cycle (e.g., changing the temperature setting or load size without changing the particular cycle between laundry loads).

In some embodiments, changing the operation of the laundry washing machine to particular cycles or changing particular parameters may temporarily override unit dose package operation mode. For example, the machine may have one or more exempt cycles, such as a "rinse" cycle or a steam cycle, in which no detergent is used. When the user selects an exempt cycle, the machine may be programmed to automatically override the unit dose package operation mode, either by reverting to the default detergent mode or by omitting the use of any detergent mode or omitting any processing steps that are affected by the selection of the detergent mode. At the completion of the exempt cycle, or if a user selects a separate cycle that is not an exempt cycle, the machine may return to the unit dose package detergent mode. Alternatively, selecting an exempt cycle may disable the unit dose package detergent mode until the user re-selects the unit dose package detergent mode.

It is believed that providing this "persistent" pod cycle selection input provides greater user convenience. This also helps avoid the possibility that a user will accidentally use a normal cleaning mode when a detergent pod is loaded into the machine, which can result in the detergent pod not being fully broken prior to being flushed into the tub.

It has thus been shown that the present invention allows various objects to be achieved. For example, it makes it possible to provide a method for operating a laundry washing machine using a unit dose treating agent which guarantees the use of all the product contained in the unit dose package and avoids any residual of the same on the laundry. It will be understood, however, that it is not strictly required for each embodiment of the invention to achieve any one or more of the objects described herein. Indeed, other utility may be obtained by practicing the inventions described herein without necessarily obtaining any of the described objectives or goals. Thus, the invention is not limited to any particular performance metrics or function other than those as might be required by a claim reciting a particular embodiment of the invention.

It is also emphasized that the laundry washing machines illustrated in the enclosed figures are of the front-loading type; however it is clear that the system according to the invention can be applied as well to a top-loading washing machine, substantially without any modification.

While the present invention has been described with reference to the particular embodiments shown in the figures, it should be noted that the present invention is not limited to the specific embodiments illustrated and described herein; on the contrary, further variants of the embodiments described herein fall within the scope of the present invention, which is defined in the claims.

What is claimed:

1. A laundry washing machine, comprising:

a cabinet supporting a washing tub;

a washing drum rotatably mounted within the washing tub and configured to receive a laundry load;

a treating agents dispenser comprising a compartment configured to receive a unit dose package containing a pre-measured amount of a treating agent; and one or more water conveying lines configured to convey water to the compartment; a supply line fluidly connecting the treating agents dispenser and the washing tub; and a control unit configured to control the laundry washing machine to:

activate a controllable valve to provide a first water supply to the washing tub through the one or more water conveying lines and the compartment;

measure a temperature of water in the washing tub and store a value of the measured temperature in a memory of the control unit; and perform a selection process based at least in part on the value of the measured temperature, the selection process comprising electing between one of:

(a) filling the washing tub with a volume of hot water when the value of the measured temperature is equal to or below a predetermined value; and (b) filling the washing tub with a volume of cold water when the value of the measured temperature is above the predetermined value.

2. The laundry washing machine of claim 1, wherein the predetermined value is 25° C.

3. The laundry washing machine of claim 1, wherein:

the selection process is based at least in part on the value of the measured temperature and on a determination of whether or not the laundry washing mode is operating in a predetermined operating mode;

step (b) of the selection process comprises filling the washing tub with a volume of cold water when both (i) the value of the measured temperature is above the predetermined value and (ii) the laundry washing machine is not operating in the predetermined operating mode; and the selection process further comprises:

(c) filling the washing tub with a volume of hot water when both (i) the value of the measured temperature is above the predetermined value and (ii) the laundry washing machine is operating in the predetermined operating mode.

4. The laundry washing machine of claim 3, wherein the predetermined operating mode comprises a sanitizing cycle.

5. The laundry washing machine of claim 1, wherein the control unit is further configured to control the laundry washing machine, after completing performance of the selection process, to fill the washing tub with an additional volume of water.

6. The laundry washing machine of claim 5, wherein the additional volume of water comprises a volume of water sufficient to fill the washing tub to a water level corresponding to one or both of a preselected washing program and a sensed load level within the washing tub.

7. The laundry washing machine of claim 1, wherein the control unit is configured to provide the first water supply by:

activating the controllable valve to provide a first portion of the first water supply;

waiting a predetermined time without providing water through the controllable valve; and after the predetermined time elapses, activating the controllable valve to provide a second portion of the first water supply.

8. The laundry washing machine of claim 7, wherein the predetermined time is at least 10 seconds.

9. The laundry washing machine of claim 7, wherein the predetermined time is at least 20 seconds.

10. The laundry washing machine of claim 7, wherein the predetermined time is at least 30 seconds.

11. The laundry washing machine of claim 1, wherein the one or more water conveying lines comprise at least one nozzle for generating a water jet over the compartment, and wherein water from the at least one water jet is oriented to directly hit the unit dose package.

12. The laundry washing machine of claim 1, further comprising an interface unit arranged at a surface of the cabinet and configured to communicate user input selections to the control unit, the user interface unit having a selection input for selecting a washing program configured for using a unit dose package, wherein the control unit selects the washing program configured for using a unit dose package as the default washing program until a user input is received to change the washing program to a different washing program.

13. The laundry washing machine of claim 1, wherein the unit dose package comprises a laundry-treating composition in a water-soluble membrane.

14. The laundry washing machine of claim 1, wherein the control unit further controls a sensor in the laundry washing machine to monitor at least one of a water level, pressure or a moisture level in the washing tub, and wherein when the at least one water level, pressure or moisture level is below a predetermined threshold, water is supplied to the washing tub to maintain a water level for the selected washing program.

* * * * *